(12) United States Patent
Carstens et al.

(10) Patent No.: US 10,580,241 B2
(45) Date of Patent: Mar. 3, 2020

(54) METHOD FOR CAUSING A CHANGE OF OPERATING MODE

(71) Applicants: Christian Carstens, Windhagen (DE); Christoph Dautz, Bonn (DE); Jochen Jansen, Bonn (DE); Ramin Benz, Bonn (DE); Christian Eisenhart, Neukirchen-Balbini (DE)

(72) Inventors: Christian Carstens, Windhagen (DE); Christoph Dautz, Bonn (DE); Jochen Jansen, Bonn (DE); Ramin Benz, Bonn (DE); Christian Eisenhart, Neukirchen-Balbini (DE)

(73) Assignee: Deutsche Post AG, Bonn (DE)

( * ) Notice: Subject to any disclaimer, the term of this patent is extended or adjusted under 35 U.S.C. 154(b) by 266 days.

(21) Appl. No.: 15/167,719

(22) Filed: May 27, 2016

(65) Prior Publication Data
US 2016/0275735 A1 Sep. 22, 2016

Related U.S. Application Data

(63) Continuation of application No. PCT/EP2014/076585, filed on Dec. 4, 2014.

(30) Foreign Application Priority Data

Dec. 5, 2013 (DE) .................. 10 2013 113 554
Apr. 11, 2014 (DE) .................. 10 2014 105 245

(51) Int. Cl.
*G07C 9/00* (2006.01)
*H04W 56/00* (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC ........... G07C 9/00; G07F 17/12; G08C 19/00; G06F 7/04; G05B 19/00
(Continued)

(56) References Cited

U.S. PATENT DOCUMENTS 5,723,911 A * 3/1998 Glehr ..................... B60R 25/24
180/287
5,973,611 A 10/1999 Kulha et al.
(Continued)

FOREIGN PATENT DOCUMENTS

CN 101635577 A 1/2010
CN 102299417 A 12/2011
(Continued)

OTHER PUBLICATIONS

H. Krawczyk et al., Request for Comments (RFC) Document 2104, HMAC: Keyed-Hashing for Message Authentication, Feb. 1997, 11 pages, Network Working Group, NY.
(Continued)

*Primary Examiner* — Nam V Nguyen
(74) *Attorney, Agent, or Firm* — Reinhart Boerner Van Deuren P.C.

(57) ABSTRACT

The disclosure relates to a method including the steps of: detection of a presence of an access authorization verification apparatus in surroundings of an access control apparatus by first communication means of the access control apparatus, and prompting, when the presence of the access authorisation verification apparatus in the surroundings of the access control apparatus is detected, of a change of operating mode for second communication means of the access control apparatus. In addition, the disclosure relates to an access control apparatus, a computer program, a recording apparatus, a system and a use for an access authorisation verification apparatus.

22 Claims, 7 Drawing Sheets

(51) Int. Cl.

| | |
|---|---|
| *H04L 29/06* | (2006.01) |
| *G06F 1/12* | (2006.01) |
| *H04L 9/08* | (2006.01) |
| *G06F 1/24* | (2006.01) |
| *H04W 12/08* | (2009.01) |
| *H04W 4/80* | (2018.01) |
| *A47G 29/14* | (2006.01) |
| *A47G 29/16* | (2006.01) |
| *G07F 17/12* | (2006.01) |
| *G06Q 10/08* | (2012.01) |
| *H04L 9/32* | (2006.01) |
| *H04L 9/00* | (2006.01) |
| *E05B 43/00* | (2006.01) |
| *E05B 65/00* | (2006.01) |
| *E05B 47/00* | (2006.01) |
| *E05B 65/52* | (2006.01) |
| *E05C 9/08* | (2006.01) |
| *E05C 9/18* | (2006.01) |
| *H04L 9/14* | (2006.01) |
| *H04L 9/30* | (2006.01) |
| *G06F 1/10* | (2006.01) |
| *G06F 21/31* | (2013.01) |
| *H04L 7/00* | (2006.01) |
| *G06F 1/04* | (2006.01) |
| *H04L 9/06* | (2006.01) |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00111* (2013.01); *G07C 9/00119* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/80* (2018.02); *H04W 12/08* (2013.01); *H04W 56/001* (2013.01); *A47G 2029/149* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(58) Field of Classification Search
USPC ............ 340/5.21, 10.1–10.5, 5.61, 5.62, 5.2; 307/10.1
See application file for complete search history.

(56) References Cited

U.S. PATENT DOCUMENTS

| | | | | |
|---|---|---|---|---|
| 6,236,333 | B1* | 5/2001 | King | B60R 25/2036 340/10.1 |
| 6,552,649 | B1* | 4/2003 | Okada | B60R 25/2036 307/10.1 |
| 6,658,328 | B1* | 12/2003 | Alrabady | G07C 9/00309 307/10.2 |
| 6,747,545 | B2* | 6/2004 | Nowottnick | G07C 9/00309 340/5.61 |
| 7,065,323 | B2* | 6/2006 | Taylor | H04W 72/02 455/63.2 |
| 7,102,487 | B2* | 9/2006 | Mafune | B60R 25/246 340/426.1 |
| 7,245,200 | B2* | 7/2007 | Inoguchi | B60R 25/245 340/10.3 |
| 7,262,684 | B2* | 8/2007 | Conner | B60C 23/04 340/5.64 |
| 7,388,466 | B2* | 6/2008 | Ghabra | E05B 81/78 307/10.5 |
| 8,009,023 | B2* | 8/2011 | Bergerhoff | B60R 25/24 340/10.41 |
| 8,258,970 | B2 | 9/2012 | Charles et al. | |
| 9,082,241 | B2* | 7/2015 | Leong | B60R 25/24 |
| 9,336,637 | B2* | 5/2016 | Neil | G07C 9/00571 |
| 9,432,361 | B2* | 8/2016 | Mahaffey | H04L 63/0853 |
| 9,747,736 | B2* | 8/2017 | Austen | G07C 9/00309 |
| 2002/0161501 | A1 | 10/2002 | Dulin et al. | |
| 2006/0077035 | A1* | 4/2006 | Mamaloukas | G07C 9/00309 340/5.61 |
| 2006/0202798 | A1* | 9/2006 | Baumgartner | B60R 25/2072 340/5.61 |
| 2006/0255908 | A1* | 11/2006 | Gilbert | B60R 25/24 340/5.61 |
| 2010/0019885 | A1 | 1/2010 | Charles et al. | |
| 2012/0234058 | A1 | 9/2012 | Neil et al. | |
| 2012/0280783 | A1 | 11/2012 | Gerhardt et al. | |
| 2013/0027180 | A1* | 1/2013 | Lakamraju | G07C 9/00087 340/5.53 |
| 2013/0176107 | A1 | 7/2013 | Dumas et al. | |

FOREIGN PATENT DOCUMENTS

| | | |
|---|---|---|
| CN | 102487288 A | 6/2012 |
| CN | 103200657 A | 7/2013 |
| DE | 699 13 607 T2 | 9/2004 |
| DE | 20 2011 101 134 U1 | 9/2011 |
| DE | 20 2012 012 010 U1 | 3/2013 |
| EP | 1 024 239 A1 | 8/2000 |
| EP | 1 336 937 A1 | 8/2003 |
| EP | 2 189 598 A1 | 5/2010 |
| EP | 2 608 103 A1 | 6/2013 |
| WO | WO 2007/128319 A2 | 11/2007 |

OTHER PUBLICATIONS

JH. Song et al., Request for Comments (RFC) Document 4493, The AES-CMAC Algorithm, Jun. 2006, 20 pages, Network Working Group, The Internet Society, WA.

* cited by examiner

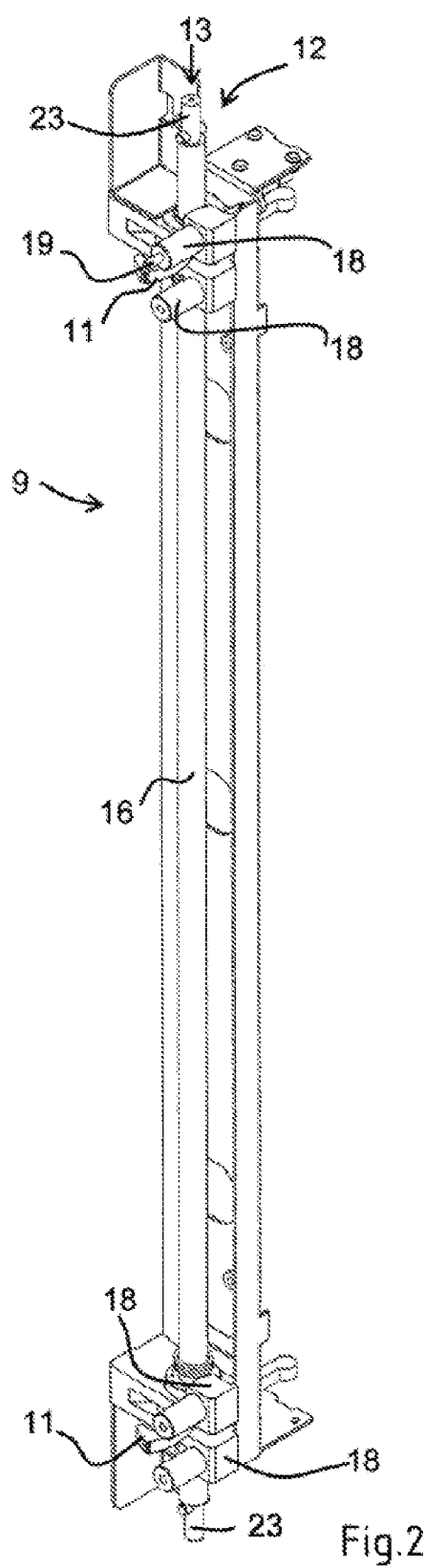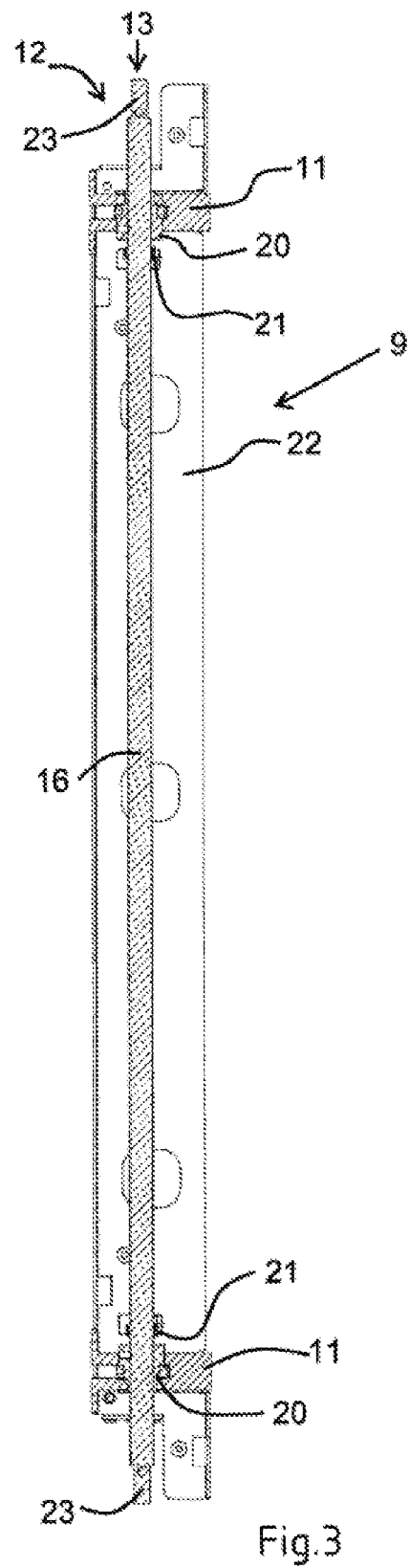

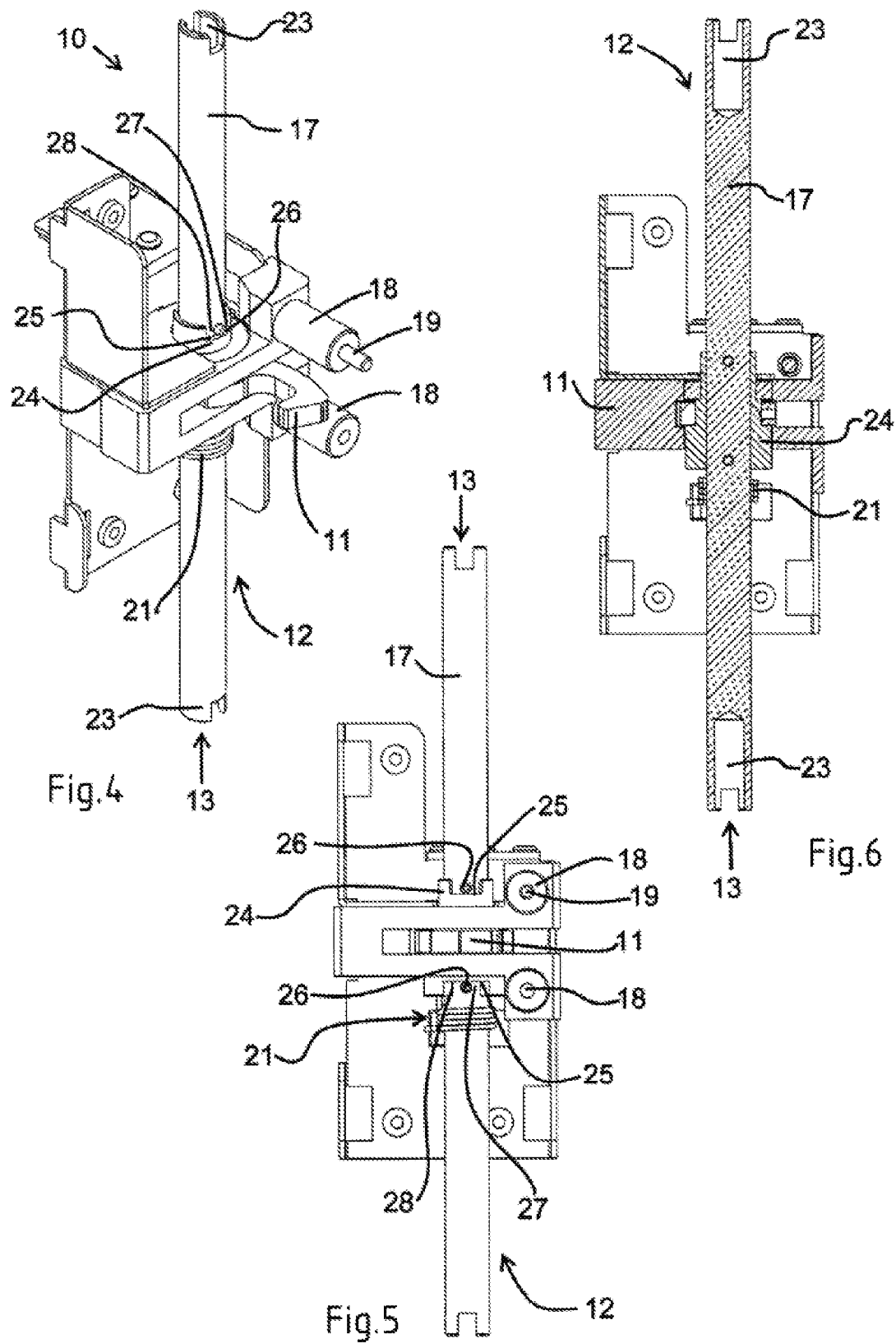

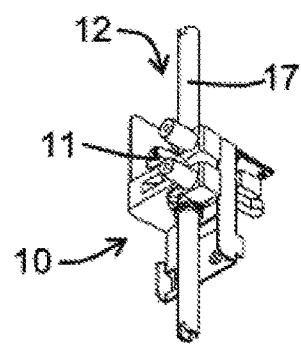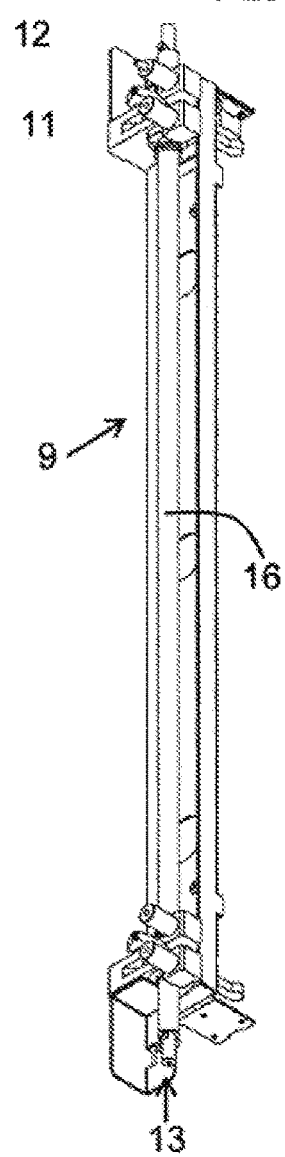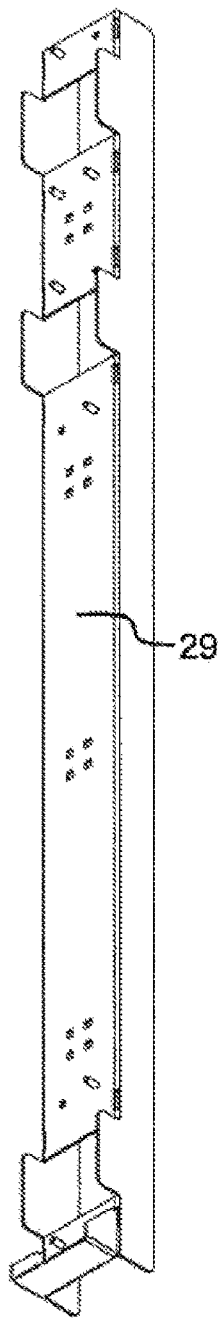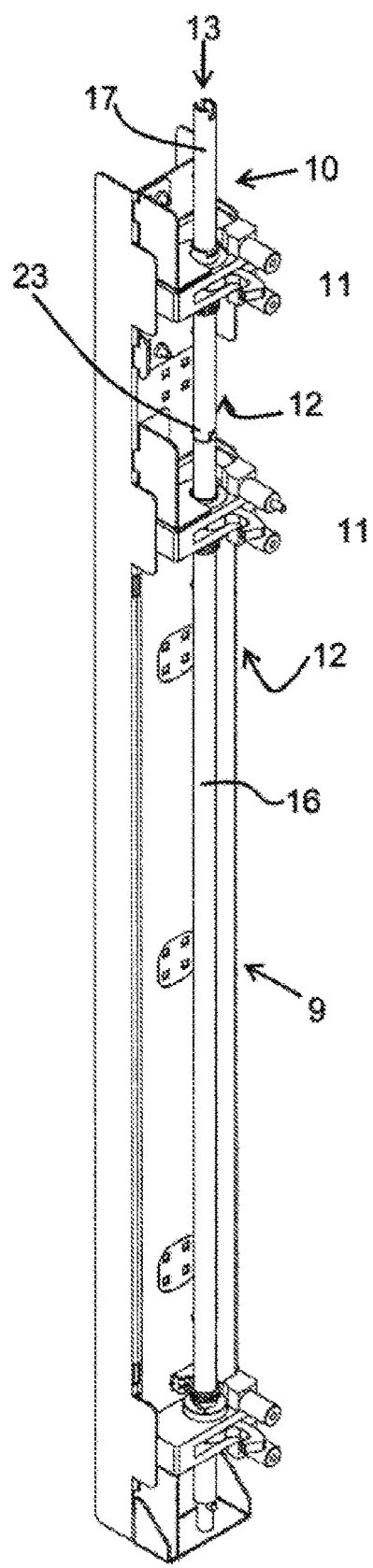
Fig.7  Fig.8  Fig.9

METHOD FOR CAUSING A CHANGE OF OPERATING MODE

CROSS-REFERENCE TO RELATED PATENT APPLICATIONS

This patent application is a continuation of PCT/EP2014/076585, filed Dec. 4, 2014, which claims priority to German Application No. 10 2013 113 554.4, filed Dec. 5, 2013, and German Application No. 10 2014 105 245.5, filed Apr. 11, 2014, the entire teachings and disclosure of which are incorporated herein by reference thereto.

FIELD

Exemplary embodiments of the invention relate to a method for causing a change of operating mode.

BACKGROUND

Access control systems are used in various respects, for example to control the access of persons to rooms in a building, as is the case of hotels, office complexes or laboratories, for example, to events or even, in an abstract form, for functions, resources or services, for example of computer functions or computer resources or server services.

A disadvantage of electronic access control systems is the high energy consumption of these systems, since they constantly need to be on standby in order to be able to grant access.

One specific application of access control systems is also formed by control of the access of persons to openings of containers, such as e.g. safety deposit boxes or goods delivery containers, particularly of parcel boxes. Parcel boxes allow a novel form of delivery/pickup of parcels for persons who wish to receive or send parcels at or in proximity to their residence even in their absence. To this end, parcel boxes are usually installed in front of the residence of the parcel box user—in a similar manner to a mail box, but with a greater receiving volume—and parcels are then delivered by the delivery agent by placing them into the parcel box or are picked up by removing them from the parcel box. In order to prevent misuse and theft, the parcel box needs to have a lock. Particularly in this specific application, the high energy consumption of the electronic access control systems is disadvantageous, since such parcel boxes frequently need to be installed retrospectively and do not have a connection to the grid, but rather are battery operated.

SUMMARY OF SOME EXEMPLARY EMBODIMENTS OF THE INVENTION

The present invention therefore addresses the object of overcoming these problems, inter alia.

According to the invention, a method is disclosed that comprises the following: detecting the presence of an access authorization verification apparatus in surroundings of an access control apparatus by first communication means of the access control apparatus, and causing, when the presence of the access authorization verification apparatus in the surroundings of the access control apparatus is detected, a change of operating mode of second communication means of the access control apparatus.

For example, the method according to the invention is a method for causing a change of operating mode, for example for changing an operating mode of the first communication means, of the second communication means and/or of the access control apparatus. For example, the method according to the invention is performed and/or controlled at least in part by an access control apparatus and/or by respective means of the access control apparatus.

According to the invention, an access control apparatus is furthermore disclosed that comprises the following: means configured to perform the method according to the invention or respective means for performing and/or controlling the steps of the method according to the invention. For example, the means of the access control apparatus according to the invention are configured to perform and/or control the method according to the invention or the steps thereof. One or more of the steps of the method according to the invention can also be performed and/or controlled by the same means. For example, the access control apparatus according to the invention comprises the first communication means and the second communication means. By way of example, one or more of the means may be formed at least in part by one or more processors.

For example, the apparatus according to the invention comprises at least one processor and at least one memory that contains program code, wherein the memory and the program code are configured to cause the apparatus having the at least one processor to perform and/or control at least the method according to the invention. In this case, either all the steps of the method according to the invention can be controlled, or all the steps of the method according to the invention can be performed, or one or more steps can be controlled and one or more steps can be performed.

For example, the access control apparatus according to the invention is an access control apparatus for a receiving apparatus, particularly a parcel box.

According to the invention, a receiving apparatus is furthermore disclosed that comprises the following: a housing, at least one door for closing at least one housing opening, a locking means that is configured to lock and unlock the at least one door, and the access control apparatus according to the invention.

According to the invention, a system is furthermore disclosed that comprises the following: the receiving apparatus according to the invention and an access authorization verification apparatus.

According to the invention, a computer program is furthermore disclosed that comprises the following: program instructions that cause a processor to perform and/or control the method according to the invention when the computer program runs on the processor.

By way of example, a processor is intended to be understood to mean control units, microprocessors, microcontrol units such as microcontrollers, Digital Signal Processors (DSP), Application-Specific Integrated Circuits (ASICs) or Field Programmable Gate Arrays (FPGAs). These can involve either all the steps of the method according to the invention being controlled, or all the steps of the method according to the invention being performed, or one or more steps being controlled and one or more steps being performed. By way of example, the computer program according to the invention may be distributable via a network such as the Internet, a telephone or mobile radio network and/or a local area network. The computer program according to the invention may at least in part be software and/or firmware of a processor. Equally, it may at least to some extent be implemented as hardware. By way of example, the computer program according to the invention may be stored on a computer-readable storage medium, e.g. a magnetic, electrical, electromagnetic, optical and/or other kind of storage medium. By way of example, the storage medium may be part of the processor, for example a (nonvolatile or volatile) program memory and/or main memory of the processor or a part thereof.

According to the invention, a use is furthermore disclosed that comprises the following: the use of an access authorization verification apparatus in the surroundings of the access control apparatus according to the invention such that the presence of the access authorization verification apparatus in the surroundings of the access control apparatus is detectable by first communication means of the access control apparatus in order to induce a change of operating mode of second communication means of the access control apparatus to be caused.

The properties of the method according to the invention, of the access control apparatus according to the invention, of the receiving apparatus according to the invention, of the system according to the invention, of the computer program according to the invention and of the use according to the invention are described—in part by way of example—below.

By way of example, an access control apparatus such as the access control apparatus according to the invention is intended to be understood to mean an apparatus that is used to perform access control, for example it is used to control access to rooms in buildings (e.g. hotels, office complexes, laboratories) or apparatuses (e.g. receiving apparatuses), to events (e.g. concerts, sports events) to functions (for example of a computer, e.g. via a login), to resources or to services (for example to a service provided by a server, e.g. online banking, social networks, email accounts). Examples of access to spaces in apparatuses are access to receiving spaces of receiving apparatuses, such as e.g. safety deposit boxes, lockers, refrigerators, goods delivery containers, mail boxes, parcel boxes, each of which are closed by doors and secured by locking means, for example. By way of example, a parcel box may have at least one receiving compartment for parcels. In addition, a parcel box may be provided with a mail slot and if need be with a receiving compartment for letters, for example.

By way of example, the access control may involve presented access authorization information being used to decide whether access can be granted. If it is decided that access can be granted, then, by way of example, access is granted, for example by sending a control signal, for example to a locking means, for example in order to unlock and/or open a door to one or more spaces (e.g. receiving spaces of a receiving apparatus) in order to allow access to the one or more spaces.

By way of example, the access control apparatus may comprise one or more control means. For example, the control means are connected (e.g. operatively connected) to the first communication means and/or to the second communication means. For example, the first communication means and the second communication means are each connected to the control means directly. For example, the connections are by cable and allow the transfer (e.g. the transmission or requesting) of information.

For example, the control means are configured to control the means of the access control apparatus (e.g. the first and/or the second communication means) and/or one or more locking means of a door at least in part and hence to be able to cause unlocking of the door and/or locking of the door, for example. An example of such control means is one or more processors.

By way of example, it is also conceivable for the access control apparatus to comprise the locking means.

An example of locking means of a door is an electronically actuatable lock and/or an electronically actuatable locking unit. For example, the control means may be configured to control such a lock and hence, by way of example, to be able to cause opening of the lock (i.e. unlocking of the door) and/or closing of the lock (i.e. locking of the door). By way of example, the locking means comprise a catch or a catch function that is configured to lock the door automatically on closing. For example, the electronically actuatable lock may be equipped with such a catch, so that the control means need only control opening of the lock, for example, while the lock is locked manually by a user by virtue of the latter using the catch and, for example by pushing the door to, causing automatic locking of the lock by the catch. For example, when the lock is opened, the catch is at least intermittently transferred to an open position (e.g. an unlocked position and/or a released position), for example by an electric motor, and after the door is opened, the catch is transferred to a shut position (e.g. a locked position and/or a closed position), for example by virtue of spring loading. When the door is pushed to, the catch is driven from the shut position into the open position and, after pushing-to has ended, the catch automatically returns to the shut position again, for example by virtue of initial spring loading for the catch, so that the closed door is locked. By way of example, a snap-action closure has such a catch function.

The access control apparatus comprises one or more electrical energy storage means (e.g. a battery, a storage battery and/or a capacitor), for example. By way of example, the access control apparatus is supplied with electric power by the energy storage means. For example, the access control apparatus is supplied with electric power exclusively by the energy storage means and/or can be supplied with electric power exclusively by the energy storage means. For example, the access control apparatus is battery operated and, by way of example, has no electrical connection, particularly no constant electrical connection (e.g. no constant electrical connection to a power supply system e.g. no constant electrical connection to an AC grid).

As described above, the access control apparatus comprises the first communication means and the second communication means, for example. The first communication means and the second communication means are each configured to communicate with other apparatuses and to transmit useful information to other apparatuses and/or to obtain useful information from other apparatuses, for example. For example, the first communication means and the second communication means are configured to obtain access authorization information from an access authorization verification apparatus.

The first communication means and the second communication means are communication means that are different from one another. By way of example, the first communication means are configured to communicate in accordance with a first wireless communication technique and/or via a first wireless communication network, and the second communication means are configured to communicate in accordance with a second wireless communication technique (which is different than the first communication technique) and/or via a second wireless communication network (which is different than the first communication network).

For example, the communication means are each configured to control a communication. For example, the first and second communication means each comprise a circuit and/or a processor that is configured to control a respective communication. For example, the communication means each comprise a processor, a main memory and a program memory. An example of such a circuit is the integrated NFC transceiver CR95HF from ST Microelectronics. For example, the first communication means are formed at least in part by the integrated NFC transceiver CR95HF from ST Microelectronics, to whose data sheet express reference is made. This data sheet is available at www[dot]st[dot]com (http://www[dot]st[dot]com/web/en/resource/technical/document/datasheet/DM00025644.pdf).

For example, the first communication means comprise a first communication interface and the second communication means comprise a second communication interface (which is different than the first communication interface). By way of example, the first communication interface is a communication interface for the first wireless communication technique and/or for the first wireless communication network and the second communication interface is, by way of example, a communication interface for the second wireless communication technique and/or for the second wireless communication network. An example of the first wireless communication technique and the second wireless communication technique is Radio Frequency Identification (RFID) and/or Near Field Communication (NFC) and/or Bluetooth (e.g. Bluetooth version 2.1 and/or 4.0). By way of example, RFID and NFC are specified in accordance with ISO standards 18000, 11784/11785 and ISO/IEC standards 14443-A and 15693. The Bluetooth specifications are available at www[dot]Bluetooth[dot]org.

For example, the first communication means are configured to communicate only with apparatuses in the closer surroundings of the access control apparatus (for example with apparatuses at a distance of less than 50 cm, preferably less than 30 cm, particularly preferably less than 12 cm). For example, the second communication means are configured to communicate only with apparatuses in the closer surroundings of the access control apparatus (for example with apparatuses at a distance of less than 100 m, preferably less than 20 m, particularly preferably less than 3 m). By way of example, the first communication network and/or the second communication network is/are what is known as a Personal Area Network and/or what is known as a Piconet.

As a result of the provision of the first communication means and of the second communication means in the access control apparatus, the access control apparatus can therefore support different communication techniques. By way of example, this is advantageous in order to allow a high level of compatibility with already existing apparatuses and devices (e.g. in order to be able to use these existing apparatuses and devices as an access authorization verification apparatus).

The access control apparatus can further comprise one or more further communication means, for example. For example, the access control apparatus comprises further communication means that are configured to communicate in accordance with a wired communication technique and/or via a wired communication network. An example of a wired communication network technique is Universal Serial Bus (USB) and/or Firewire (IEEE 8594). For example, the access control apparatus comprises a corresponding further communication interface. For example, the access control apparatus can be serviced via this further communication interface.

By way of example, the access control apparatus may be configured such that it is configured (in particular exclusively) for communication with access authorization verification apparatuses. For example, the first and second communication means of the access control apparatus are configured to communicate exclusively with access authorization verification apparatuses. By way of example, the access control apparatus has no connection to a mobile radio network, a Local Area Network (LAN), a Wireless Local Area Network (WLAN) and/or the Internet, and it is therefore an "offline" access control apparatus, for example.

The access control apparatus may be part of an apparatus for which it controls access and with which it is associated, for example a receiving apparatus such as the receiving apparatus according to the invention (e.g. a parcel box).

By way of example, the access authorization verification apparatus is a portable electronic appliance. By way of example, the access authorization verification apparatus is configured to communicate with the first communication means and/or the second communication means of the access control apparatus. For example, the access authorization verification apparatus can comprise corresponding communication means, for example an analog circuit for sending and receiving (also referred to as a transceiver), a circuit (e.g. a digital circuit and/or a processor) and a memory (for example an EEPROM—Electrically Erasable Programmable Read-Only Memory).

By way of example, the access authorization verification apparatus is in the form of a portable electronic appliance and associated with a user who wishes to use the access authorization information to gain access to the access control apparatus, and is therefore referred to as a "user appliance" below. By way of example, the user appliance comprises display means such as a graphical user interface and/or power supply means such as a dedicated power supply. By way of example, the user appliance is a mobile telephone, a Personal Digital Assistant (PDA), a Media Player (e.g. an iPod) and/or a navigation appliance. If the access control apparatus is associated with a parcel box, then the user appliance may belong to a parcel box user, for example, that is to say an owner of the parcel box, for example, or to a person who is permitted to use the parcel box to receive parcels or to place them for pickup by a delivery agent. In this context, a delivery agent is not understood to be a user. For example, the user appliance is configured for wireless communication with the access control apparatus, for example in accordance with the first communication technique and/or with the second communication technique and/or via the first communication network and/or the second communication network.

Alternatively, the access authorization verification apparatus may be a portable electronic appliance of a delivery agent, for example, particularly if the access control apparatus is associated with a parcel box. This appliance is referred to as "delivery agent appliance" below. By way of example, the delivery agent appliance comprises display means such as a graphical user interface, power supply means such as a dedicated power supply and means for wireless capture of information from parcels, for example by means of optical scanning of parcel labels and/or capture of information from parcels by radio (e.g. RFID) or magnetic fields (e.g. NFC), for example when the parcel has an RFID tag or NFC tag. For example, the delivery agent appliance is configured for wireless communication with the access control apparatus, for example in accordance with the first communication technique and/or the second communication technique and/or via the first communication network and/or the second communication network. An example of a delivery agent appliance is a hand-held scanner, e.g. Honeywell's LXE Tecton MX7.

Alternatively, the access authorization verification apparatus may be a portable electronic unit for wireless communication with the access control apparatus, for example. This portable electronic unit is referred to as a "tag" below. By way of example, the tag may not have any capability for communication by means of cellular mobile radio and/or any capability for communication by means of WLAN and/or any capability for communication by means of Bluetooth. By way of example, the tag may not have a display means such as a graphical user interface and/or a power supply means such as a dedicated power supply. By way of example, the tag can communicate only in the presence of an (e.g. electromagnetic, electrical or magnetic) field (e.g. a field of a communication interface such as a read field of a reader). By way of example, the tag may be an RFID or NFC tag (e.g. a MiFARE DESFire from NXP). By way of example, the tag may have different form factors. By way of example, it may be in the form of a key fob or in the form of a card (e.g. for example with the form factor of a credit card). By way of example, the tag may have small dimensions (e.g. less than 9 cm or 5 cm for each of height/length/width) and low weight (e.g. less than 50 g).

Therefore, different types of access authorization verification apparatus (e.g. user appliance, delivery agent appliance, tag) are conceivable, at least some of which support different communication techniques. For example, different persons or groups of persons can use different access authorization verification apparatuses (e.g. in order to communicate a piece of access authorization information to an access control apparatus).

By way of example, the invention's use of the access authorization verification apparatus is intended to be understood to mean that a user (e.g. a user or a delivery agent) brings the access authorization verification apparatus into the surroundings of the access control apparatus (e.g. holds it in front of the access control apparatus, holds it in the surroundings of the access control apparatus, holds it at a distance of less than 50 cm, preferably less than 30 cm, particularly preferably less than 12 cm, from the access control apparatus, etc.).

For example, the first communication means are configured to detect that there is an access authorization verification apparatus in the surroundings of the access control apparatus. By way of example, detection of a presence of an access authorization verification apparatus in the surroundings of the access control apparatus by the first communication means is intended to be understood to mean that the first communication means establish that there is at least a high probability of an access authorization verification apparatus being in the surroundings of the access control apparatus.

The detection by the first communication means is preferably intended to be effected without communication between the access control apparatus and the access authorization verification apparatus. For example, the first communication means are configured to detect that there is an object having ferromagnetic properties (e.g. with a relative permeability of greater than 1) in the surroundings of the access control apparatus. For example, an access verification authorization apparatus typically has ferromagnetic properties (e.g. on account of the metal components used therein, such as an antenna). If an object having ferromagnetic properties is detected in the surroundings of the access control apparatus, then in this example there is at least a high probability of there being an access verification authorization apparatus in the surroundings of the access control apparatus. The detection may therefore possibly also detect a presence of other objects in the surroundings of the access control apparatus. However, the present invention merely relates to the detection of an access authorization verification apparatus in the surroundings of the access control apparatus, which means that in the present case only the detection of an access authorization verification apparatus in the surroundings of the access control apparatus is described.

By way of example, the surroundings of the access control apparatus are intended to be understood to mean the spatial region surrounding the access control apparatus in which a presence of an access authorization verification apparatus is detectable by the first communication means. By way of example, the surroundings of the access control apparatus or the spatial region surrounding the access control apparatus in which a presence of an access authorization verification apparatus is detectable by the first communication means may be limited by the decrease in the power of a magnetic, electrical and/or electromagnetic signal generated by the first communication means. By way of example, such a signal can be emitted by an antenna. For example, the surroundings of the access control apparatus are limited to a spatial region at a distance of less than 50 cm, preferably less than 30 cm, particularly preferably less than 12 cm, from the first communication means (e.g. from an antenna of the first communication means).

By way of example, causing a change of an operating mode of second communication means of the access control apparatus is intended to be understood to mean that a change (e.g. a transition) of the operating mode of the second communication means from one operating mode to another operating mode is induced (e.g. by the first communication means and/or the control means of the apparatus). For example, the first communication means and/or the control means of the access control apparatus are configured to communicate a control signal to the second communication means when a presence of an access authorization verification apparatus (and/or of another object) in the surroundings of the access control apparatus is detected, with the control signal inducing the second communication means to change the operating mode. Examples of an operating mode are an active mode, an energy saving mode, a detection mode, an off mode and/or a sleep mode.

By way of example, an active mode is an operating mode in which at least all the main functions of a means and/or of a component are active. A main function of the first communication means and of the second communication means is the communication function, for example. For example, the first communication means and the second communication means can communicate with other apparatuses only in the active mode. For example, the access control apparatus is in the active mode when all of its means and/or components are in the active mode. For example, the access control apparatus is in the active mode when at least the control means of the access control apparatus, the first communication means and the second communication means are in the active mode.

By way of example, an energy saving mode is an operating mode in which a means and/or a component consumes less energy than in the active mode. For example, at least some functions of a means and/or of a component are reduced and/or deactivated in the energy saving mode. By way of example, an energy saving mode is a sleep mode, an off mode and/or a detection mode. In the detection mode, a means and/or a component checks, for example at regular and/or irregular intervals of time, whether a predefined condition (e.g. a wake up condition) is satisfied. If the predefined condition (e.g. the wake up condition) is satisfied, then the means and/or the component changes the operating mode, for example (e.g. from the detection mode to the active mode). For example, the detection of a presence of an access authorization verification apparatus in the surroundings of the access control apparatus is one such condition. In the off mode, a means and/or a component is completely deactivated (that is to say "off"), for example. The change from an energy saving mode to an active mode can also be referred to as wakeup.

For example, the first communication means are in a detection mode for the detecting and the second communication means are in an energy saving mode (e.g. an off mode). For example, both the first communication means and the second communication means change to the active mode when the presence of the access authorization verification apparatus in the surroundings of the access control apparatus is detected. For example, the access control apparatus is in an energy saving mode for the detecting and changes to the active mode when the presence of the access authorization verification apparatus in the surroundings of the access control apparatus is detected.

By way of example, the present invention is advantageous because only the first communication means of the access control apparatus are used for the detection in order to monitor a condition for the change of at least the second communication means from an energy saving mode to the active mode. The first communication means are therefore also used, in addition to for communication (e.g. in the active mode), as a "sensor" for monitoring a wake up condition for the second communication means (e.g. in the detection mode). The second communication means may therefore be completely deactivated (e.g. may be in the off mode) in the energy saving mode, so that (in comparison with the case in which the first communication means and the second communication means are used for the detection) energy can be saved. This is advantageous particularly for battery operated apparatuses in order to achieve the longest possible replacement interval or a longer life for the battery.

Further advantages of the disclosed invention are described below on the basis of exemplary embodiments, the disclosure of which is intended to apply equally to the respective categories (method, apparatus, system, computer program).

In accordance with one exemplary embodiment of the invention, the first communication means are configured to communicate wirelessly in accordance with a first communication technique, and the second communication means are configured, in accordance with this exemplary embodiment of the invention, to communicate wirelessly in accordance with a second communication technique, which is different than the first communication technique.

For example, the frequencies that are used for transmitting information in the first communication technique and the second communication technique are different than one another. For example, in accordance with the first communication technique, frequencies of 20-855 kHz, 85.56 MHz or 865-869 MHz are used for the transmission information. For example, in accordance with the second communication technique, frequencies of 2.402 to 2.480 GHz are used for transmitting information.

For example, the signal forms that are used for the respective information transmission in the first communication technique and in the second communication technique are different than one another. For example, the information is transmitted inductively by magnetic signals (e.g. via a magnetic field), capacitively by electrical signals (e.g. via an electrical field) or via electromagnetic signals (e.g. an electromagnetic wave) in accordance with the first communication technique. For example, information is transmitted via another of these signal forms in accordance with the second communication technique. By way of example, the information is transmitted inductively by magnetic signals (e.g. via a magnetic field) in accordance with the first communication technique and via electromagnetic signals (e.g. an electromagnetic wave) in accordance with the second communication technique.

For example, the first communication technique is an active/passive communication technique. In the case of an active/passive communication technique, a passive communication subscriber can be supplied with power by an active communication subscriber. For example, the active communication subscriber generates a magnetic, electrical and/or electromagnetic field from which the passive communication subscriber can draw power. For example, the first communication means generates such a field (e.g. an antenna of the first communication means generates such a field). For example, the second communication technique is an active/active communication technique. In the case of an active/active communication technique, the communication subscribers each supply themselves with power.

For example, the first communication technique is a communication technique in accordance with the first communication standard such as the NFC specification or the RFID specification. As described above, RFID and NFC are specified in accordance with ISO standards 18000, 11784/11785 and ISO/IEC standard 14443-A and 15693, for example. For example, the second communication technique is a communication technique in accordance with a second communication standard, which is different than the first communication standard, such as the Bluetooth specification. The Bluetooth specifications are available at www[dot]Bluetooth[dot]org, as described above.

In accordance with one exemplary embodiment of the invention, the access authorization verification apparatus is configured to communicate wirelessly in accordance with the second communication technique. Additionally, it is also conceivable for the access authorization verification apparatus to be configured to communicate wirelessly in accordance with the first communication technique. Alternatively, the access authorization verification apparatus may also be configured to communicate wirelessly exclusively in accordance with the second communication technique. For example, the access authorization verification apparatus comprises corresponding communication means such as a communication interface.

In accordance with one exemplary embodiment of the invention, the detecting is performed at regular intervals of time. For example, the detection is repeated at regular intervals of time. For example, the detection is repeated regularly at an interval of from 50 to 5000 ms, preferably 200 to 800 ms, particularly preferably 300 to 500 ms. For example, the detection is repeated every 375 ms. However, it is also conceivable for the detection to be performed at irregular intervals of time.

For example, the detection is repeated at regular or irregular intervals of time so long as the first communication means are in the detection mode. For example, the detection is not repeated so long as the first communication means are in another operating mode, for example an active mode. For example, the first communication means are inactive in the intervals of time between the detection in the detection mode, which means that the detection mode is particularly energy saving. The length of the intervals of time can influence this energy saving effect.

In accordance with one exemplary embodiment of the invention, the presence of the access authorization verification apparatus in the surroundings of the access control apparatus alters at least one physical quantity that is capturable by the first communication means. For example, the physical quantity is altered in the state in which the access authorization verification apparatus is present in the surroundings of the access control apparatus in comparison with the state in which the access authorization verification apparatus is not present in the surroundings of the access control apparatus. For example, the physical quantity is altered solely by virtue of the access authorization verification apparatus being brought into the surroundings of the access control apparatus. When alteration of this physical quantity is determined, there is therefore an at least high probability of there being an access authorization verification apparatus in the surroundings of the access control apparatus.

For example, the first communication means comprise a sensor and/or a measuring circuit that is configured to measure the physical quantity and/or to capture an alteration in the physical quantity. An example of a physical quantity that is capturable by the first communication means is a current strength of a current (e.g. a transmission current, a reception current and/or an antenna current), a voltage (e.g. a transmission voltage, a reception voltage and/or an antenna voltage), a power (e.g. a transmission power and/or a reception power), a resistance (e.g. a radiation resistance, resistance loss, base resistance), a magnetic field strength and/or an electrical field strength, for example.

As described above, the first communication means are configured, for example, to detect that there is an object having ferromagnetic properties such as an access authorization verification apparatus in the surroundings of the access control apparatus. By way of example, the physical quantity that is capturable by the access control apparatus can be influenced by an object having ferromagnetic properties.

In accordance with one exemplary embodiment of the invention, the at least one physical quantity is a current strength of a current in an antenna of the first communication means when a signal is sent and/or when an electrical, magnetic and/or electromagnetic field is generated. For example, a resistance of the antenna (e.g. a base resistance, a resistance loss and/or a radiation resistance) is altered when an object is brought into the surroundings of the access control apparatus. For example, the detection always involves a signal having the same power being sent, which means that the current in the antenna when the signal is sent is altered when the resistance of the antenna (e.g. the base resistance, the resistance loss and/or the radiation resistance) changes. For example, the current is the antenna current when a signal is sent. For example, the current is the driver current when the signal is sent (e.g. the driver current of a driver circuit for the antennas). For example, the signal is a burst signal. By way of example, it is also conceivable to measure not the current strength of the current in the antenna but rather the transmission power and/or the resistance of the antenna during sending.

By way of example, an antenna is intended to be understood to mean any device that is suitable for outputting (e.g. emitting) an electrical signal, a magnetic signal and/or an electromagnetic signal to the surroundings. By way of example, a device for emitting a magnetic signal is a magnetic antenna such as a conductor loop (e.g. a planar conductor loop) and/or a coil (e.g. a planar coil). By way of example, a device for emitting an electromagnetic signal is a patch antenna and/or a linear antenna such as a dipole antenna. In particular, a device for generating and/or outputting an NFC signal such as an NFC antenna and/or an NFC coil is also intended to be understood as an antenna.

By way of example, this embodiment is advantageous because communication means normally have a capability of capturing and monitoring the antenna current and/or the transmission power, so that no or only slight changes to the communication means need to be made in order to capture a current strength of a current in an antenna when a signal is sent, for example.

In accordance with one exemplary embodiment of the invention, the method further comprises capturing the at least one physical quantity for detecting a presence of an access authorization verification apparatus in the surroundings of the access control apparatus (e.g. by the first communication means), and comparing a measured value that represents the at least one physical quantity captured for the detecting with at least one calibration value (e.g. by the first communication means and/or the control means of the access control apparatus).

As described above, the first communication means comprise a sensor and/or a measuring circuit, for example, that is configured to measure the physical quantity (directly or indirectly) and/or to capture an alteration in the physical quantity. An example of a measuring circuit for measuring a resistance is a measuring bridge, for example.

An example of a physical quantity that is capturable by the first communication means is a current strength of a current (e.g. a transmission current, a reception current and/or an antenna current), a voltage (e.g. a transmission voltage, a reception voltage and/or an antenna voltage), a power (e.g. a transmission power and/or a reception power), a resistance (e.g. a radiation resistance), a magnetic field strength and/or an electrical field strength, for example.

By way of example, a measured value representing the physical quantity is intended to be understood to mean a quantized measured value of the measured physical quantity. For example, the first communication means comprise a digital/analog converter and/or an analog/digital converter in order to quantize the measured physical quantity (e.g. a 6-bit digital/analog converter and/or a 6-bit analog/digital converter). By way of example, the first communication means comprise what is known as a tracking converter, which is formed by a digital/analog converter and a comparator, inter alia. The comparator of the tracking converter compared to the output value from the digital/analog converter with the measured physical quantity, for example, the output value from the digital/analog converter being raised or lowered in steps until there is a minimal discrepancy between the output value from the digital/analog converter and the measured physical quantity.

For example, the calibration value represents a measured value for the physical quantity in the state in which the access authorization verification apparatus is not present in the surroundings of the access control apparatus. As a result of the comparison of the measured value representing the at least one physical quantity captured for the detecting with at least one calibration value, it is therefore possible to determine whether the physical quantity has altered in comparison with the state in which the access authorization verification apparatus is not present in the surroundings of the access control apparatus. For example, the first communication means and/or the control means of the access control apparatus are configured to compare the measured value representing the at least one physical quantity captured for the detecting with the at least one calibration value.

By way of example, the detecting further comprises determining, at least in part on the basis of the result of comparison, whether an access authorization verification apparatus is present in the surroundings of the access control apparatus. For example, it is determined that an access authorization verification apparatus is present in the surroundings of the access control apparatus when the discrepancy between the measured value representing the at least one physical quantity captured for the detecting and the calibration value exceeds a threshold value. By way of example, the threshold value may be predefined or can be determined in accordance with a predefined rule. For example, the first communication means and/or the control means are configured to detect (e.g. to determine and/or establish) a presence of an access authorization verification apparatus in the surroundings of the access control apparatus in this case. Alternatively, provision may also be made, by way of example, for the measured value representing the at least one physical quantity captured for the detecting to be compared with an upper calibration value and a lower calibration value. For example, it is determined that an access authorization verification apparatus is present in the surroundings of the access control apparatus when the measured value representing the at least one physical quantity captured for the detecting is not situated between the lower calibration value and the upper calibration value. For example, the first communication means and/or the control means are configured to detect (e.g. to determine and/or establish) a presence of an access authorization verification apparatus in the surroundings of the access control apparatus in this case.

In accordance with one exemplary embodiment of the invention, the method further comprises calibrating the first communication means for detecting the presence of an access authorization verification apparatus in the surroundings of the access control apparatus. By way of example, calibrating the first communication means for the detection is intended to be understood to mean determining the at least one calibration value. For example, the calibration value is invariable and is determined once during the manufacture/configuration of the access control apparatus. For example, an invariable calibration value of this kind is predefined on an ongoing basis by means of collation of a measuring bridge (e.g. by means of laser trimming of a resistance of the measuring bridge) during the manufacture of the access control apparatus. For example, an invariable calibration value of this kind is determined during configuration of the access control apparatus and is stored, and hence predefined, on an ongoing basis in a memory of the first communication means and/or the control means. However, it is also conceivable for the calibration value to be variable and to be determined dynamically (e.g. each time the first communication means change to the detection mode, e.g. prior to the change or after the change or during the change).

In accordance with one exemplary embodiment of the invention, the calibrating comprises capturing the at least one physical quantity by the first communication means for calibrating the first communication means for the detection, and determining the at least one calibration value at least in part on the basis of the physical quantity captured for calibration (e.g. by the first communication means and/or the control means of the access control apparatus).

As described above, the first communication means are configured to capture the physical quantity. For calibrating the first communication means, the first communication means capture the physical quantity in a state in which the access authorization verification apparatus is not present (or at least has a high probability of not being present) in the surroundings of the access control apparatus, for example. For example, the calibrating is performed once during the manufacture/configuration of the access control apparatus or each time the first communication means change to the detection mode (e.g. prior to the change or after the change or during the change). Both during the manufacture/setup and during the change to the detection mode, it is assumed that the probability of an access authorization verification apparatus being situated in the surroundings of the access control apparatus is low.

Determining the at least one calibration value at least in part on the basis of the physical quantity captured for calibration by the first communication means comprises the quantization of the captured physical quantity, for example. Furthermore, determining the at least one calibration value can comprise determining an upper calibration value and a lower calibration value (e.g. by means of additions or subtraction of a safety value), for example. For example, the first communication means and/or the control means are configured to determine the at least one calibration value at least in part on the basis of the physical quantity captured for calibration.

By way of example, the calibrating is advantageous in order to mask out influences of surroundings during the detection. For example, the calibrating can mask out the influence of an object having ferromagnetic properties that is constantly situated in the surroundings of the access control apparatus. If the calibrating is performed on each change to detection mode, for example, it is even possible to mask out the influence of an object that is intermittently situated in the surroundings of the access control apparatus (e.g. a key ring put down/forgotten thereon).

In accordance with one exemplary embodiment of the invention, the calibrating is performed only once prior to the detecting and/or only once prior to multiple repetitions of the detecting. As described above, the calibrating is performed each time the first communication means change to the detection mode (and/or the access control apparatus changes to the energy saving mode) for example. For example, the calibrating is performed only when the first communication means change to the detection mode (and/or the access control apparatus changes to the energy saving mode). For example, the calibrating is performed prior to the change or after the change or during the change.

In accordance with one exemplary embodiment of the invention, the method further comprises generating, when the presence of the access authorization verification apparatus in the surroundings of the access control apparatus is detected, a piece of information about the presence of the access authorization verification apparatus in the surroundings of the access control apparatus. For example, the first communication means generate the information.

By way of example, a piece of information about the presence of the access authorization verification apparatus in the surroundings of the access control apparatus is intended to be understood to mean any information that makes it possible to infer that the presence of the access authorization verification apparatus in the surroundings of the access control apparatus has been detected. By way of example, a piece of information is generated when a value representing the information is stored in a memory (e.g. one or more bits are set in a register).

In accordance with one exemplary embodiment of the invention, the method further comprises storing the piece of information about the presence of the access authorization verification apparatus in the surroundings of the access control apparatus in a memory of the first communication means, and/or transmitting the piece of information about the presence of the access authorization verification apparatus in the surroundings of the access control apparatus to control means of the access control apparatus and/or to the second communication means. For example, the information is stored and/or transmitted by the first communication means.

For example, the first communication means are configured to store a piece of information about the presence of the access authorization verification apparatus in the surroundings of the access control apparatus. For example, the first communication means comprise a memory such as a register. For example, the control means of the access control apparatus and/or the second communication means are configured to check whether the memory of the first communication means stores a piece of information about the presence of the access authorization apparatus in the surroundings of the access control apparatus. For example, the control means and/or the second communication means query the memory at regular or irregular intervals of time.

For example, the first communication means are configured to change from the detection mode to an active mode when the presence of the access authorization verification apparatus in the surroundings of the access control apparatus is detected. For example, the first communication means are further configured to store a piece of information about the operating mode of the first communication means in a register. In this example, it is possible for the information about the operating mode of the first communication means to be used (e.g. by the control means and/or the second communication means) to infer the detection of the presence of the access authorization verification apparatus in the surroundings of the access control apparatus, so that the information that the operating mode of the first communication means is an active mode is a piece of information about the presence of the access authorization verification in the surroundings of the access control apparatus. For example, the control means and/or the second communication means query the register (and hence a piece of information about the presence of the access verification apparatus in the surroundings of the access control apparatus) at regular or irregular intervals of time. For example, the control means and/or the second communication means are configured to query the register (and hence a piece of information about the presence of the access authorization verification apparatus in the surroundings of the access control apparatus) at regular or irregular intervals of time when they are in the energy saving mode.

Alternatively or additionally, the first communication means may also be configured to transmit the information about the presence of the access authorization verification apparatus in the surroundings of the access control apparatus to the control means of the access control apparatus and/or to the second communication means. By way of example, transmitting the information is intended to be understood to mean that the first communication means send the information to the control means and/or the access control apparatus.

In accordance with one exemplary embodiment of the invention, the method further comprises obtaining access authorization information from the access authorization verification apparatus by the first communication means and/or the second communication means, deciding whether access can be granted, at least in part on the basis of the obtained access authorization information by the access control apparatus, and granting access if it has been decided that access can be granted.

By way of example, the first communication means and/or the second communication means are used to obtain access authorization information that has been communicated to the access control apparatus, particularly by an access authorization verification apparatus on which the access authorization information is stored at least intermittently. By way of example, the access authorization information can be communicated to the access control apparatus in accordance with a wireless communication technique, for example in accordance with RFID, NFC or Bluetooth.

For example, the first communication means and/or the second communication means are configured to obtain the access authorization information from the access authorization verification apparatus. For example, the first communication means and/or the second communication means are configured to obtain the access authorization information from the access authorization verification apparatus when they are in an active mode. By way of example, the first communication means and/or the second communication means can obtain the access authorization information from the access authorization verification apparatus only in the active mode. For example, the access authorization verification apparatus communicates the access authorization information to the first communication means in accordance with the first communication technique and/or to the second communication means in accordance with the second communication technique.

By way of example, deciding whether access can be granted is intended to be understood to mean that a check is performed to determine whether the obtained access authorization information authorizes access. For example, the control means of the access control apparatus are configured to check whether the obtained access authorization information authorizes access. For example, the control means of the access control apparatus are configured to check whether the obtained access authorization information authorizes access when they are in an active mode.

By way of example, the access authorization information is intended to be understood as information that it is evaluated as part of a check performed by the access control apparatus to determine whether access can be granted for an entity. The check on the access authorization information does not need to be the only check as part of the access control, and there may be further necessary conditions required so that access can be granted, for example. Examples of access authorization information are a code or a key, for example, that is communicated to the access control apparatus and is compared with a code or key stored in the access control apparatus in order to decide, in the event of a match, that access can be granted. The code or key may be additionally protected against spying out, for example by means of encryption. By way of example, the code or key can be used on an ongoing basis or can be changed at regular or irregular intervals. By way of example, a predefined regulation may allow a new code to be generated according to temporal guidelines (e.g. every day) or whenever a code is used. This can be effected both in the access control apparatus and in the access authorization verification apparatus so that both each have corresponding pairs of codes or keys, or in the access control apparatus and in a unit from which the access authorization verification apparatus obtains the code or key.

An alternative exemplary form of access authorization information is described in EP 1 024 239 A1, for example, in which the access authorization information is in the form of an access token $t_{ij}$ that defines access rights $a_{ij}$, for example in the form: "Grant user $u_i$ access to lock $l_j$ until Feb. 1, 2001". The access rights are then transferred to a lock and crosschecked. By way of example, a check is thus formed to determine whether it is the user $u_i$ who presents the access token, whether the access token is valid to the lock $l_j$ and whether the validity period "until Feb. 1, 2001" for the lock has not yet expired. Additionally, the access rights $a_{ij}$ can be provided with a message authentication code (MAC), for example an HMAC according to Request for Comments (RFC) document 2104. The MAC is based on a key $s_j$ that is known both on a unit that generates the access token and in the lock. The access token $t_{ij}$ then comprises the HMAC and the access rights $a_{ij}$, for example in concatenated form. The lock can then use the received MAC, the received access rights $a_{ij}$ and the key $s_j$ to confirm the authenticity of the access token and can then check the access rights $a_{ij}$. Alternatively, the access rights can, in accordance with EP 1 024 239 A1, also be defined as follows: "Grant for user who knows k access to lock $l_j$ until Jan. 1, 2001". The user then needs to have both the access token $t_{ij}$ and knowledge about k (a key) in order to obtain access to the lock $l_j$ and is provided with both (for example in encrypted form) by a unit that generates the token.

For example, access is granted by causing the unlocking of a door or of multiple doors of a receiving apparatus (e.g. of a parcel box). For example, the control means may be configured to control the lock and hence to be able to cause opening of the lock (i.e. unlocking of the door) and/or closing of the lock (i.e. locking of the door), for example.

For example, a user of a parcel box (e.g. a user or a delivery agent) can open a door of the parcel box by holding an access authorization verification apparatus (e.g. a user appliance, a delivery agent appliance and/or a tag) in the surroundings of the first communication means. As described above, it is then possible, for example first of all, to cause the access control apparatus to change to an active mode when the first communication means detect the presence of the access authorization verification apparatus. Subsequently, it is possible, by way of example, for the first communication means to obtain a piece of access authorization information from the access authorization verification apparatus. However, it is also conceivable for, by way of example, the second communication means to subsequently obtain a piece of access authorization information from the access authorization verification apparatus. If the access authorization information authorizes access, the door of the parcel box is then unlocked, for example, and can be opened by the user. In this example, the user, by using the access authorization verification apparatus in the surroundings of the first communication means, therefore induces both the change of the operating mode of the access control apparatus and the unlocking of the door of the parcel box.

In accordance with one exemplary embodiment of the invention, the method further comprises measuring (e.g. by the control means of the access control apparatus) the time since at least one event captured by the access control apparatus has taken place, and causing, when the door is open and the measured time exceeds a predefined deactivation time threshold value, locking of the door (e.g. by the control means of the access control apparatus) to be deactivated such that the door is not lockable.

For example, the at least one event captured by the access control apparatus is detecting a presence of the access authorization verification apparatus in the surroundings of the access control means, receiving access authorization information from an access authorization verification apparatus, causing the unlocking of the at least one door and/or opening at least one door. For example, the access control apparatus comprises a sensor and/or a sensor circuit that is configured to capture such an event. An example of a sensor is a Hall sensor, a door opening sensor, a light barrier, the first communication means and/or the second communication means.

For example, the access control apparatus comprises timing means for measuring the time (e.g. a timer circuit and/or a timer function, for example a timer circuit and/or a timer function of the control means).

By way of example, locking of the door being deactivated is intended to be understood to mean that the door is not lockable (that is to say can be opened from inside and from outside, e.g. can be opened by pushing the door or pulling the door). For example, the deactivation of the locking of the door is caused by the control means of the access control apparatus. As described above, it is possible for the control means of the access control apparatus to control a lock of the door, for example. For example, the control means can control the lock to transfer a catch of the lock into an open position, so that the catch no longer automatically locks the door when it is closed. So long as the catch is in the open position, the locking of the door is therefore deactivated, for example. Another way of deactivating the locking of the door is for the catch to be blocked such that the catch cannot be transferred from the shut position into the open position, for example.

By way of example, the time threshold value is chosen such that the probability of the user (e.g. the delivery agent) still being in proximity to the access control apparatus that has opened the door is low. As a result of the deactivation of the locking of the door at this time, it is therefore possible to prevent the door from being locked in an unsupervised manner and/or unintentionally (e.g. by children at play).

In accordance with one exemplary embodiment of the invention, the method further comprises causing a change of the operating mode of the first communication means, of the second communication means and/or of the access control apparatus from an energy saving mode to an active mode when the presence of the access authorization verification apparatus in the surroundings of the access control apparatus is detected.

For example, the control means of the access control apparatus are configured to cause a change of the operating mode of the first communication means, of the second communication means and/or the control means (e.g. particularly of the second communication means and of the control means) when the presence of the access authorization verification apparatus in the surroundings of the access control apparatus is detected. By way of example, the whole access control apparatus, with or without the first communication means, is woken up.

In accordance with one exemplary embodiment of the invention, the method further comprises measuring (e.g. by the control means of the access control apparatus) the active time since at least one event captured by the access control apparatus has taken place, and causing, when the measured active time exceeds a predefined active time threshold value, a change of the operating mode of the first communication means, of the second communication means and/or of the access control apparatus from the active mode to the energy saving mode.

As described above, the at least one event captured by the access control apparatus is detecting a presence of the access authorization verification apparatus in the surroundings of the access control means, receiving access authorization information from an access authorization verification apparatus, causing the unlocking of at least one door and/or opening at least one door, for example. For example, the access control apparatus comprises a sensor and/or a sensor circuit that is configured to capture such an event. For example, the access control apparatus comprises timing means for measuring the time (e.g. a timer circuit and/or a timer function, for example a timer circuit and/or a timer function of the control means).

The predefined active time threshold value is less than 1 hour, preferably less than 30 minutes, particularly preferably less than 16 minutes, for example.

For example, the control means of the access control apparatus are configured to cause a change of the operating mode of the first communication means, of the second communication means and/or of the control means when the measured active time exceeds a predefined time threshold value. By way of example, this is advantageous in order to reduce the energy consumption of the access control apparatus.

In accordance with one exemplary embodiment of the invention, the first communication means are in a detection mode (e.g. an energy saving detection mode) for the detection, and the second communication means are in an energy saving mode for the detecting.

In accordance with one exemplary embodiment of the invention, the access control apparatus further comprises capture means that are configured to capture (e.g. to receive and/or obtain) signals from the access authorization verification apparatus and to evaluate the power of the captured signals. For example, the capture means are further configured to compare the power of the captured signals with a power threshold value. If the power of the captured signals is above a power threshold value, then a change of the operating mode of the second communication means and/or the access control apparatus is caused (e.g. by the capture means), for example. For example, the power threshold value is chosen such that the access authorization verification apparatus must be in the surroundings of the access control apparatus (e.g. at a distance of less than 1 m, preferably less than 10 cm, particularly preferably less than 5 cm from the access control apparatus and/or the capture means, e.g. less than 2 cm from the access control apparatus and/or the capture means) in order for the power of the captured signals to be above the power threshold value.

For example, the power of the captured signals is periodically evaluated (e.g. periodically scanned). For example, the signals are electromagnetic, electrical or magnetic signals. By way of example, the signals are electromagnetic signals (e.g. radio signals) with a frequency of 2.4 Ghz. For example, the signals are Bluetooth signals.

For example, the capture means are a sensor and/or a sensor circuit for signals. For example, the capture means comprise an antenna (e.g. a patch antenna) and a reception power evaluation circuit. For example, the capture means comprise a patch antenna, an antenna matching section having a narrowband 2.4 GHz HF filter, a power detector for 2.4 GHz HF signals, a level evaluation section for the received HF energy and a keying circuit for the pulsed polling in order to largely block interference signals as a result of other RF media (e.g. WLAN) and in order to reduce power consumption.

By way of example, the captured means are advantageous in order to provide additional means that can cause a change of the operating mode (e.g. when the proportion of ferromagnetic material in the access authorization verification apparatus is not large enough to cause an alteration in the physical quantity that the first communication means are able to capture, as described above).

The exemplary embodiments and exemplary refinements of the present invention that are described above are also intended to be understood as disclosed in all combinations with one another.

Further advantageous exemplary refinements of the invention can be found in the detailed description that follows for a few exemplary embodiments of the present invention, particularly in conjunction with the figures. The figures accompanying the application are intended to be used only for clarification, however, rather than for determining the scope of protection of the invention. The accompanying drawings are not necessarily to scale and are intended merely to reflect the general concept of the present invention by way of example. In particular, features included in the figures are in no way intended to be regarded as a necessary part of the present invention.

BRIEF DESCRIPTION OF THE SEVERAL VIEWS OF THE DRAWING

In the drawings:

FIG. 2 shows a three-dimensional view of a locking element module for the first door of the parcel box shown in FIG. 1;

FIG. 3 shows a sectional drawing through the locking element module shown in FIG. 2;

FIG. 4 shows a three-dimensional view of a locking element module for the second door of the parcel box shown in FIG. 1;

FIG. 5 shows a side view of the locking element module shown in FIG. 4;

FIG. 6 shows a sectional drawing through the locking element module shown in FIG. 4;

FIG. 7 shows an exploded representation of the locking element modules shown in FIG. 2 and FIG. 4 prior to assembly thereof;

FIG. 8 shows an assembly support for assembly of the connecting element modules;

FIG. 9 shows locking element modules as shown in FIG. 2 and FIG. 4 when assembled on the assembly support shown in FIG. 8, in a three-dimensional view;

DETAILED DESCRIPTION OF THE INVENTION

Figure 1:
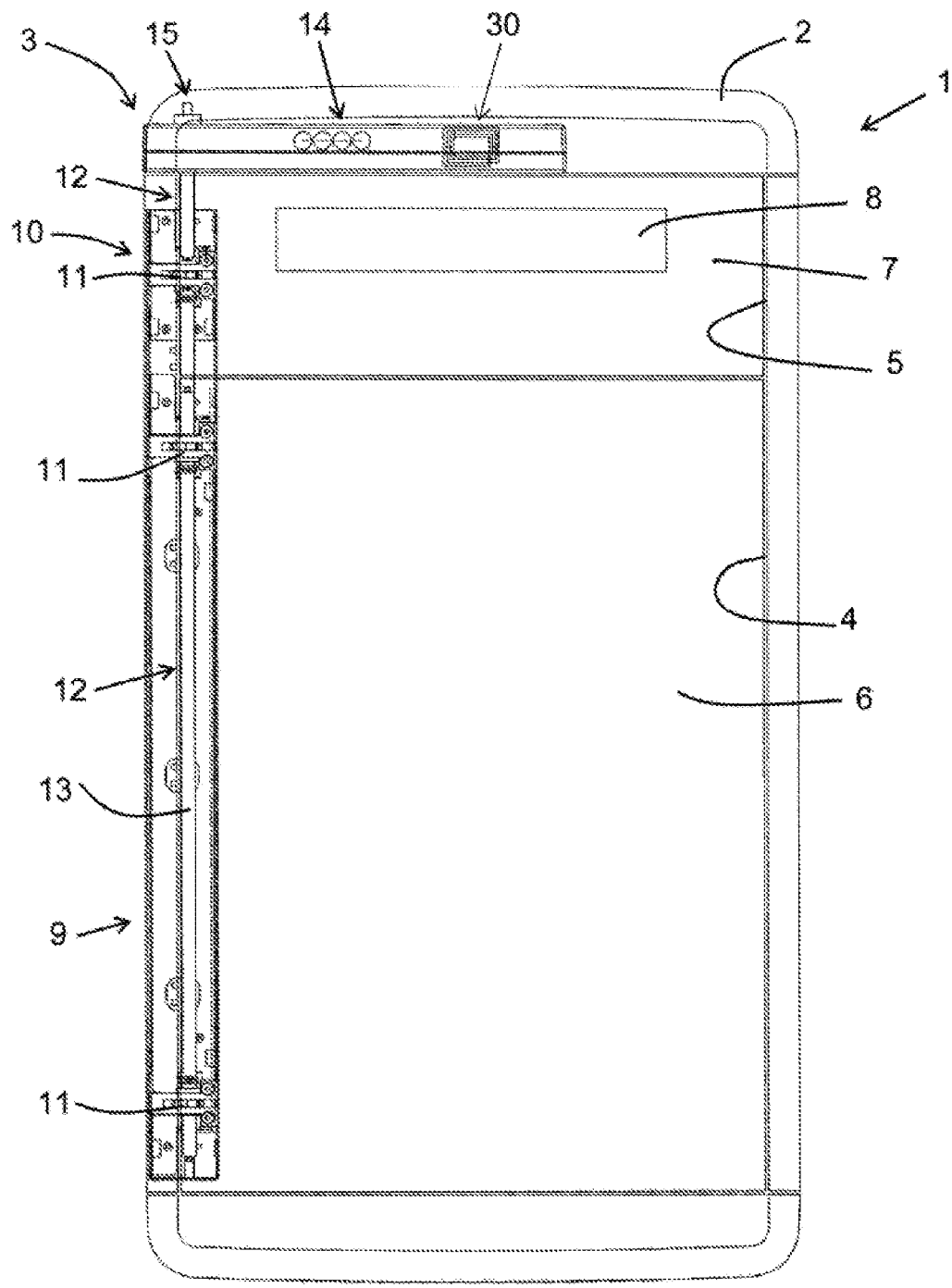
FIG. 1 shows a view of an exemplary embodiment of a parcel box according to the invention.

A receiving apparatus according to the invention is described with reference to FIGS. 1 to 9 on the basis of a particularly preferred embodiment as a parcel box 1 for receiving letters and parcels that are to be delivered. However, it is pointed out that although the parcel box 1 is a particularly preferred embodiment of the present invention, the invention is not limited to use in parcel mail boxes, and in particular the access control apparatus according to the invention is not limited to use in a parcel box such as the parcel box 1, but rather can be used generally in access control systems.

The parcel box 1 comprises a housing 2, a locking unit 3 and an access control apparatus 30 according to the invention. The housing 2 has a first housing opening 4 for a first receiving compartment for parcels and a second housing opening 5 for a second receiving compartment for letters. In addition, the parcel box 1 comprises a first door 6 for closing the first housing opening 4 and a second door 7 for closing the second housing opening 5. The second door 7 has a slot 8 for posting letters without opening the second door 7 of the second receiving compartment. The slot may be provided with an outwardly or inwardly openable flap (not shown), for example, which is not locked. Both doors 6, 7 can be locked by means of the locking unit 3.

The locking unit 3 has one locking element module 9, 10 having at least one locking member 11, which is in the form of a hook closure in the example shown, for each door 6, 7 and having a locking drive 12 for actuating the locking members 11.

In the parcel box 1, the locking element module 9 for the first door 6 has two locking members 11 and the locking element module 10 for the second door 7 has just one locking member 11. The locking drive 12 for each of the two locking element modules 9, 10 has a common drive element 13 that is in the form of a rotatable shaft in the form of a rod. The rod 13 as a common drive element is designed to be able to move (to be able to rotate) around an adjustment path.

In a first adjustment position, the rod 13 brings just the locking member 11 for the first door 6 into an unlocked position. In the second adjustment position, which is reached by means of further rotation of the rod 13 as a common drive element, the locking members 11 for all the doors 6, 7 are brought into an unlocked position. For the common drive element 13 of the locking drives 12 of the respective locking element modules 9, 10, an electric motor drive 14 is provided that is coupled to the common drive element 13 (rod) in an operative connection by means of a coupling 15 such that the electric motor drive 14 can move the rod 13 (rotatable shaft as a common drive element) between the different adjustment positions.

The design of the locking unit 3 is described in more detail below with reference to FIGS. 2 to 9, on the basis of the example of the parcel box 1 with two doors 6, 7. The features described and/or presented can, as is readily evident to a person skilled in the art, also be transferred to other housings 2 having possibly more than two housing openings 4, 5 by combining or coupling the individual locking element modules 9, 10 with or to one another in a correspondingly larger number.

The locking element module 9 shown in FIG. 2 for the first door 6 has, as a locking drive 12, a first rod portion 16 that is connected to a second rod portion 17 of the locking element module 10 shown in FIG. 4 in order to form the common drive element 13 of the locking unit 3.

The first rod portion 16 has two locking members 11, which are in the form of hook closures, arranged on it by virtue of these locking members 11 (hook closures) being secured to the first rod portion 16 in immobile fashion, i.e. so as to be fixed and unable to rotate relative to the first rod portion 16. The first rod portion 16 thus forms the locking drive 12 of the first locking element module 9 for the first door 6 by virtue of rotation of the rod portion 16 causing direct concomitant rotation of the hook closure 11, specifically from the locked position shown in FIG. 2 into an unlocked position in which the hook closure 11 releases a bolt element—not shown—at the first door 6, so that the door 6 can be opened.

In order to open the first door 6 automatically when the hook closure 11 releases the bolt element of the first door, guide brackets 18 for holding an ejection ram 19 pretensioned by means of a compression spring or the like are provided both above and below the hook closure in the axial direction. As shown in FIG. 2, an ejection ram 19 is normally sufficient to open the door automatically after the locking is released.

The ejection ram 19 may have a door opening sensor, for example a permanent magnet interacting with a magnet sensor, arranged on it in order to detect an open state of the door. This can be used for a log book function of the access control apparatus 30, for example, which records the opening and closing of the doors 6, 7 of the housing 2 in a log book. Such a log book can be retrieved and checked by the user.

The sectional drawing shown in FIG. 3 reveals that the locking members 11 in the form of hook closures are connected to the first rod portion 16 of the first locking element module 9 via an assembly sleeve 20, so that the assembly sleeve 20 and the locking member 11 cannot be rotated relative to the shaft (as part of the common drive element 13) formed by the first rod portion 16. The forces involved in rotation of the first rod portion 16 are thus transferred directly to the hook closure (locking member 11).

It would therefore fundamentally also be possible for the hook closure 11 to be connected to the first rod portion 16 directly, i.e. without the provision of an assembly sleeve 20. However, the use of the assembly sleeve has the advantage that use of the assembly sleeve 20 allows the same locking member 11 to be used for the first locking element module 9 and the second locking element module 10, which will be described in more detail later with reference to FIGS. 4 to 6.

The first locking element 9 is in the form of a snap lock. This means that the locking members 11 are pretensioned in the closing direction, i.e. into the locked positions shown in FIG. 2. For this purpose, a return spring 21 is provided adjacent to the locking member 11 on the first rod portion 16, said return spring having one end secured to the first rod portion 16 and having the other end secured to a locking element module member 22 that carries the elements of the first locking element module 9. When the first rod portion 16 is rotated from the closed position of the locking member 11, which is shown in FIG. 2, into an adjustment position in which the locking member 11 releases a bolt element—not shown—of the first door 6, the return spring 21 is tensioned further, so that the rod portion 16, when it is no longer held in the release adjustment position by the electric motor drive 14, rotates back until the locking member 11 is in the locked position shown in FIG. 2.

When an open door 6 is now closed, the locking member 11 is pushed out of the locked position by the bolt element that is present on the door 6 by virtue of the rod portion 16 being rotated counter to the force of the return spring 21. As soon as the door 6 is in the closed position, the hook closure in the form of locking member 11 can enclose the bolt element of the door 6, so that the rod portion 16 is returned to the locked position on account of the return force of the return spring 21 and the bolt element of the door 6 engages in the hook opening of the hook closure 11. This is referred to as a snap lock.

The second locking element module 10 to the second door 7, which is shown in detail in FIGS. 4 to 6, has a second rod portion 17 that can be coupled to the first rod portion 16 via a coupling 23 (also referred to as coupling pieces). To this end, elements of the coupling 23 are formed both on the first rod portion 16 and on the second rod portion 17 and, when the two rod portions 16, 17 are connected, engage in one another with a form fit and transmit the rotary movement of one rod portion 16, 17 directly to the other rod portion 16, 17. In a manner analogous to the locking element module 9 for the first door 6, the locking element module 10 for the second door 7 also has a locking member 11 that is in the form of a hook closure and that, as a result of rotation of the second rod portion 17, can be adjusted between a closed position that is shown in FIG. 4 and an unlocking or released position in which the hook closure 11 releases a bolt element—not shown—of the second door 7.

In the unlocked position, the second door 7 is automatically opened by an ejection ram 19 that is provided in a guide bracket 18. As in the case of the first locking element module 9 too, there are two guide brackets 18 in the axial direction on both sides of the locking member 11, an ejection ram 19 needing to be provided only in one of the two guide brackets in order to reliably open the second door 7 after unlocking.

Unlike in the case of the first locking element module 9, the locking member 11 of the second locking element module 10 is mounted so as to be able to rotate with the defined play around the rotatable shaft 13 formed by the second element 17 in the region of the second locking element module 10. As a result, a locking member 11 that is rotatably mounted on the second rod portion 17 is concomitantly moved only when the play in the adjustment path of the common drive element 13, or of the second rod portion 17, is exceeded. Only then does the rotary movement of the locking member 11 begin, which disengages the hook closure (locking member 11) from a bolt element of the second door 7. Thus, only then is the second door 7 opened and hence the second housing opening into the receiving compartment for letters released.

To provide the play, the locking member 11 of the second locking element module 10 is rotatably mounted on the second rod portion 17 by means of a bushing. To this end, the bushing 24 has a recess 25 that is guided so as to be mobile on the shaft 13 formed by the rod portion 17, which shaft is itself also rotatable. To this end, a pin 26 protruding radially on the shaft 13 engages in the recess 25 in the bushing 24. This defines the play for the rotation of the bushing 24 on the shaft 25 because the pin 26 can rotate in the recess 25 until it reaches the edge of the recess 25 before the bushing 24 is concomitantly rotated during movement of the rod portion 17. The hook closure 11 is connected to the bushing 24 in a fixed manner.

As revealed by the side view of the locking element module 10 for the second door 7 shown in FIG. 5, the bushing 24 has two recesses 25 at the opposite axial ends of the bushing 24, in which recesses a respective pin 26 engages that protrudes radially on the rotatable shaft 13 formed by the second rod portion 17. The effect achieved by this is that the bushing 24 is axially fixed by the two pins 26 that engage in the recesses 25, and the recess 25 that holds the pins 26 predefines the play for the rotation of the bushing 24 around the shaft 13.

In the closed position, shown in FIG. 4 and FIG. 5, in which the hook closure 11 is in the locked position, the pins 26 are held in a central region of the recess 25 that defines the play for the rotation of the bushing 24 on the shaft. This results in two regions of play 27, 28 in the recess 25 for each direction of rotation of the shaft 13 or of the second rod portion 17. The effect achieved by the first region of play 27 is that the first rod portion 17 can initially be rotated in the direction of an opening movement without the locking member 11 being rotated away out of its locked position, in which it releases the bolt element of the second door 7. On the other hand, as already explained, the rotary movement of the rotatable shaft 13 as a common drive element causes the locking member of the first rod portion 16 in a first locking element module 9 to be transferred into an unlocked position already, so that the first door 6 opens already. The effect achieved by the first region of play 27 in the recess 25 is thus that the second door 7 opens only after the first door 6.

Thus, if the rotatable shaft 13 as a common drive element is taken only into a first adjustment position in which the radially protruding pin 26 in the recess 25 utilizes only the first region of play 27 without butting against the edge of the recess 27 and concomitantly move the bushing 24, then only the first door 6 is unlocked and the second door 7 remains locked. A correspondingly controlled rotary movement for the rotatable shaft 17 can thus release specifically only the first door 6 for opening.

Only if the rotatable shaft 13 is rotated further into a second adjustment position does the radially protruding pin 26 abutting the edge of the recess 25 entrain the bushing 24, and hence the hook closure 11, so as also to unlock the second door 7.

If, by contrast, the second door 7 is open and the rotatable shaft 13, or the second rod portion 17, is in the locked position shown in FIGS. 4 and 5, then the locking member 11, when the door is pushed to into its locked position, is pushed out of the locked position shown in FIGS. 4 and 5 by virtue of the bolt element of the door bumping against the locking member 11. In this case, the bushing 24 on the rotatable shaft 13, or the second rod portion 17, is rotated until the second door 7 is in its closed position and the bolt element of the second door 7 can be encompassed by the hook closure 11. In this position, the hook closure 11, driven by the return spring 21, snaps back into the closed position analogously to the previously described case for the first locking element module 10.

For this, the second region of play 28 in the recess 25 is provided, which allows movement of the bushing 27 (and of the locking member 11 firmly connected to the bushing 27) without the common drive 26 being concomitantly rotated.

As is evident from the sectional drawing shown in FIG. 6, the bushing 24, apart from the pin 26 that is guided in the recess 25, is mounted so as to be freely mobile on the second rod portion 17.

For the coupling 23 of the second rod portion 17 to the first rod portion 16, the second rod portion 17 has an axial hole having a recess with a radial profile, in which recess a shaft core—shown in FIG. 3—having a pin with a radial profile engages, so that the first and second rod portions 17 can be plugged into one another in the axial direction in a simple manner and transmit a rotation directly to one another. The shaft core and the axial hole are also referred to as coupling pieces that interact in a suitable manner in order to cause the coupling 23.

The coupling pieces of the coupling 23 on the first rod portion 16 and the second rod portion 17 are of symmetrical design about the horizontal central axis, so that there is left/right interchangeability for the first locking element module 9 and the second locking element module 10. As a result, it is a simple matter for the module to be swapped from a door as a door with a right-hand hinge to a door as a door with a left-hand hinge or vice versa by means of rotation through 180°.

In order to achieve this interchangeability for the engagement of the locking members 11 with the bolt elements—not shown—of the doors 6, 7 too, provision is additionally made for the one or more locking members 11 to be arranged on a rod portion 16, 17 with mirror-image symmetry in relation to the horizontal central axis of the rod portion 16, 17 in the axial direction. That is to say that the locking members are arranged on both halves of the rod portion 16, 17 symmetrically in relation to the center of the rod portion 16, 17. Hence, the locking members 11 are each at the same level in axial terms following rotation of the locking element module 9, 10 through 180°, so that they can accordingly engage with the bolt elements of the doors 6, 7.

FIG. 7 shows an exploded representation of the locking element module 9 for the first door and the locking element module 10 for the second door 7, these already having been explained in detail previously with reference to FIG. 2 and FIG. 4. The locking element modules 9, 10 accordingly have a first rod portion 16 and a second rod portion 17 that can be plugged into one another by means of the previously described coupling 23, so that rotation of one rod portion 16, 17 causes the concomitant rotation of the other rod portion 17, 16.

FIG. 7 shows the two elements shortly before they are put together. After being put together, the first rod portion 16 and the second rod portion 17 together form the common drive element 13 (rotatable shaft) that can be connected to the electric motor drive 14 by means of the coupling 15 (cf. FIG. 1). The electric motor drive 14 can also contain a controller having an authentication function that, depending on the authentication that has taken place, performs the adjustment of the rotational shaft 13 as a common drive element such that either only the first door 6 (particularly of the parcel compartment) or, jointly, the first door 6 and the second door 7 (particularly of the parcel compartment and of the mail box together) is/are opened.

In order to make the snap lock effective, provision may be made for opening of the doors 6 and/or 7, as evidenced by a corresponding door opening sensor in conjunction with the ejection ram 19 for each door 6, 7, for example, to be followed by the rotatable shaft 13 being rotated back by the electric motor drive 14 into the closed position again, in which the locking members 11 have the positions shown in FIGS. 4 and 6.

After the locking element modules 9, 10 have been put together, they can be assembled on the assembly carrier 29 in the form of a fitting panel that is shown in FIG. 8, with the locking element modules 9, 10 being able to be arranged in either of the two possible positions rotated through 180° for when the doors 6, 7 have a right-hand or left-hand hinge.

FIG. 9 shows the assembly carrier 8 with the locking element modules 9, 10 assembled thereon, the first and second rod portions 16, 17 of which have been joined to form the common drive element 13 (rotatable shaft).

The proposed locking unit 3 proposes a locking mechanism that is simple to handle for a housing 2 having housing openings 4, 5 that can each be closed and locked by doors 6, 7, a first group of doors 6 being able to be unlocked separately by virtue of a common drive element 13 of the locking unit 3 being brought into a first adjustment position. When the common drive element 13 is taken into a second adjustment position, both doors 6, 7 are then unlocked together. This application is particularly well suited to a parcel box in which a parcel delivery agent can open and close the first door of the parcel compartment independently of the second door of the letter compartment.

Figure 10:
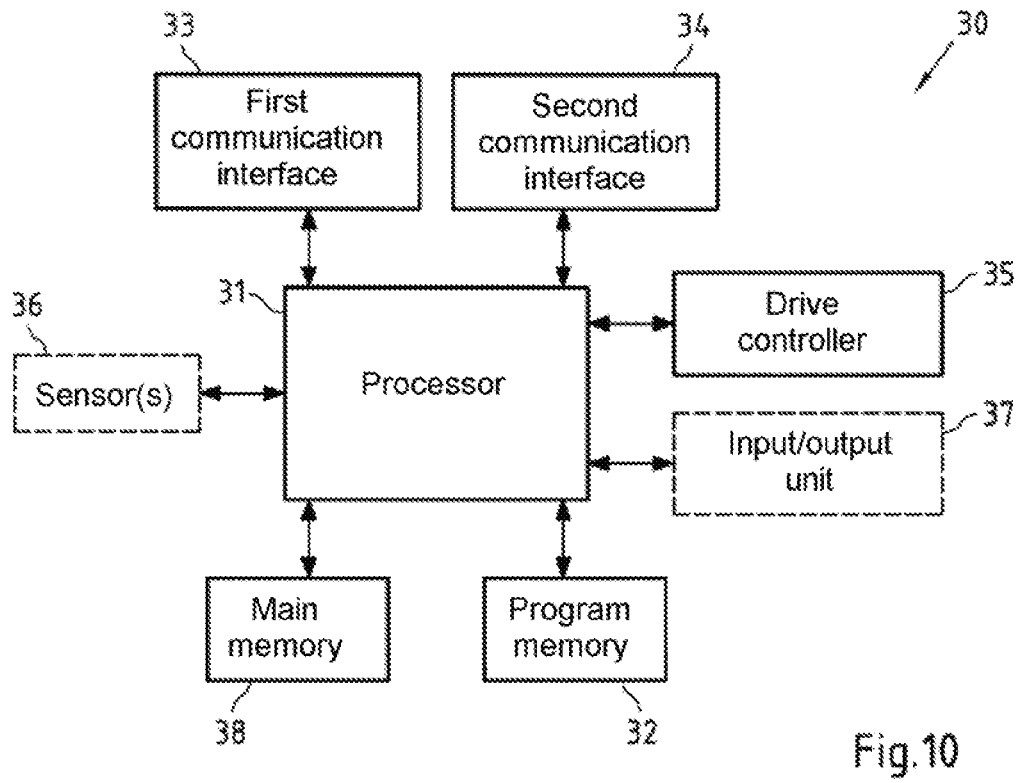
FIG. 10 shows a block diagram of the electronic components of an exemplary embodiment of an access control apparatus according to the invention.

FIG. 10 is a block diagram of an exemplary embodiment of the access control apparatus 30 according to the invention. As FIG. 1 shows, the access control apparatus 30 may, by way of example, be arranged inside the parcel box 1, for example in proximity to the drive 14 (see FIG. 1).

Processor 31 of the access control apparatus is particularly in the form of a microcontroller. Processor 31 executes program instructions that are stored in program memory 32, and stores interim results or the like in main memory 38, for example. For example, program memory 32 is a nonvolatile memory such as a flash memory, a magnetic memory, an EEPROM memory, a persistent memory such as a ROM and/or an optical memory. Main memory 38 is a volatile or nonvolatile memory, for example, particularly a random access memory (RAM) such as a static RAM (RAM), a dynamic RAM (DRAM), a ferroelectric RAM (FeRAM) and/or a magnetic RAM (MRAM).

Preferably, program memory 32 and main memory 38 are arranged together with processor 31 in one module.

Figure 11:
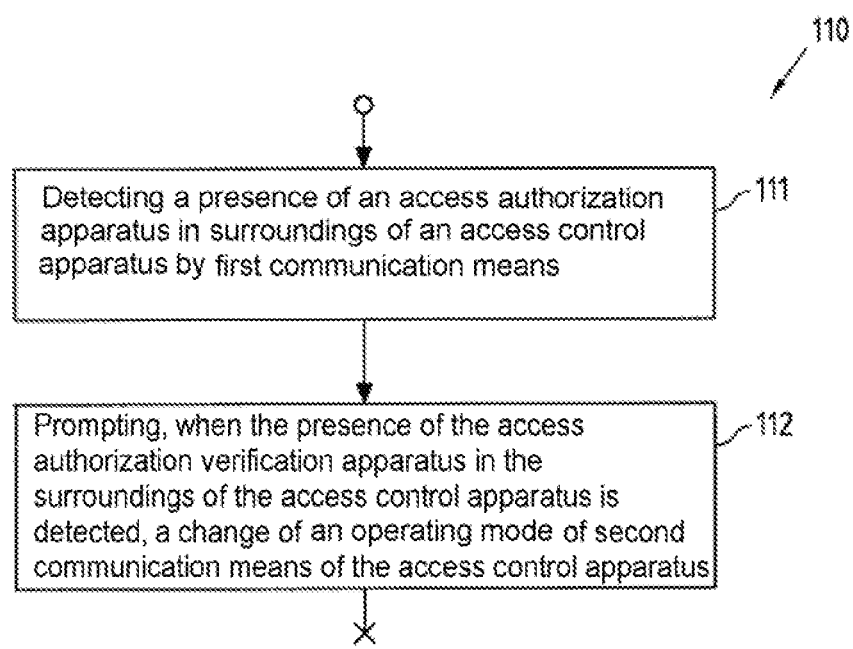
FIG. 11 shows a flow chart for an exemplary embodiment of a method according to the invention.
Figure 12:
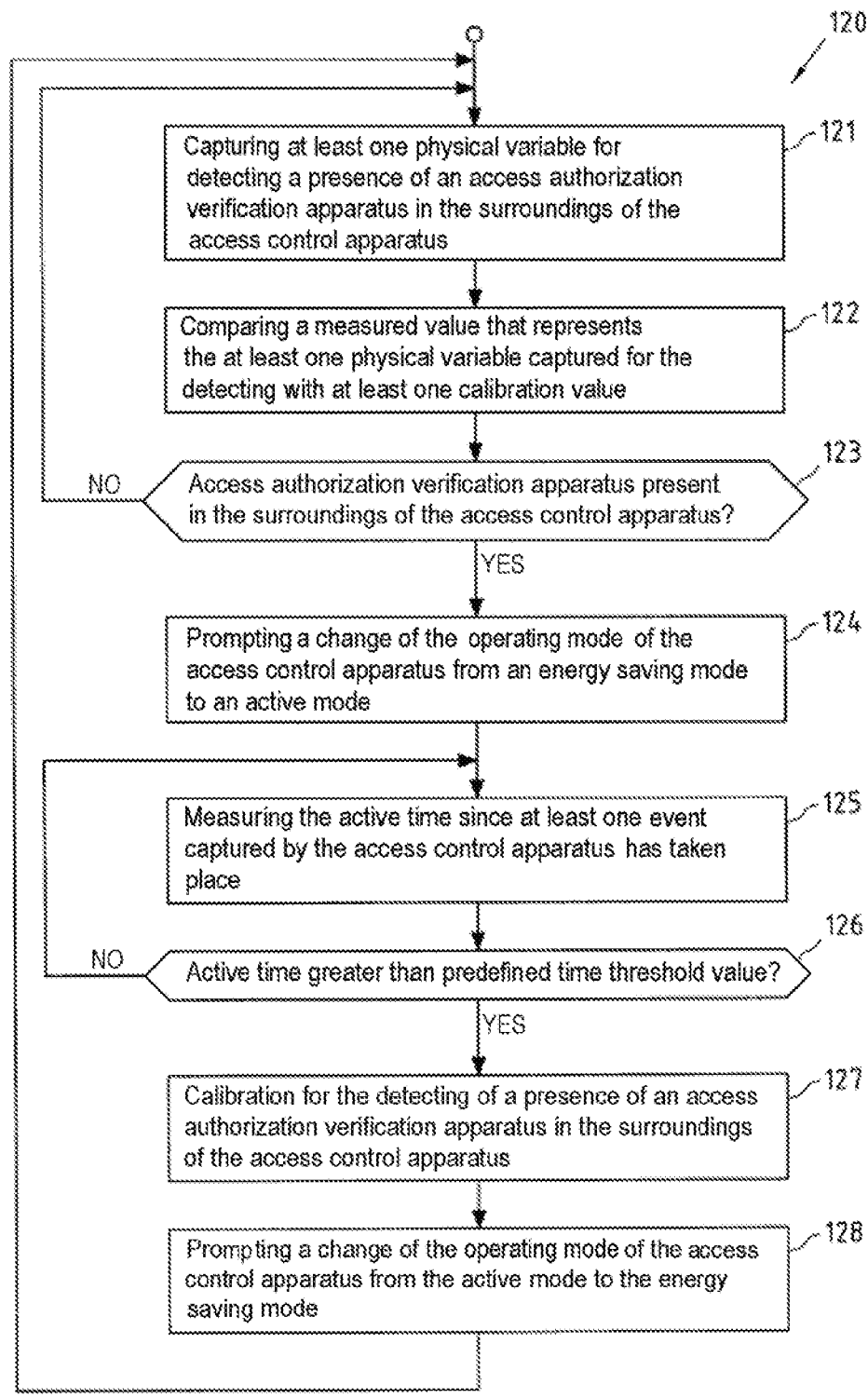
FIG. 12 shows a flow chart for an example of a method according to the invention.

By way of example, a program memory 32 stores the program instructions that cause the processor 31, when it executes the program instructions, to perform and/or control at least some of the methods presented in FIGS. 11 and 12. The program memory 32, or a separate (persistent) memory, may also store information that is used for checking the authorization of a person to open one or more doors 6, 7 of the parcel box 1 (e.g. an identifier for the parcel box 1 and/or for the access control apparatus 30, one or more keys for checking a piece of access authorization information, etc.).

For example, the first communication interface 33 is configured to communicate in accordance with a first wireless communication technique. For example, the second communication interface 34 is configured to communicate in accordance with a second wireless communication technique. It is subsequently assumed by way of example that the first wireless communication technique is NFC and that the second wireless communication technique is Bluetooth (e.g. Bluetooth version 2.1 and/or 4.0). For example, the communication interfaces 33, 34 each comprise a processor, a main memory and a program memory. For example, the program memory of the first communication interface 33 stores program instructions that cause the first communication interface 33, when the processor of the first communication interface 33 executes the program instructions, to perform and/or control at least some of the method presented in FIGS. 11 and 12. For example, the first communication interface 33 is formed at least in part by an integrated NFC transceiver such as the NFC transceiver CR95HF from ST Microelectronics and an NFC antenna (e.g. a magnetic antenna). For example, the second communication interface 34 is formed at least in part by a Bluetooth transceiver and a Bluetooth antenna.

By way of example, the processor 31 can use the communication interfaces 33 and 34 to communicate with other apparatuses such as an access authorization verification apparatus. By way of example, the processor 31 is operatively connected to the first communication interface 33 and the second communication interface 34. By way of example, the communication interfaces can receive or request information from other apparatuses and forward it to processor 31 and/or can receive information from processor 31 and send it to other apparatuses. For example, processor 31 controls the first communication interface 33 and/or the second communication interface 34 at least in part.

The processor additionally controls a drive controller 35 that is configured to control the drive 14 (see FIG. 1). By way of example, the drive controller is part of the drive 14.

However, it is also conceivable for the drive controller not to be part of the drive 14. By way of example, control signals from the processor 31 are converted in the drive controller 35 into voltage signals for the drive 14 in order to move the common drive element 13 coupled to the drive 14 into a first or second adjustment position or into the closed position. By way of example, the movement position adopted by the common drive element 13 can be checked using one or more of the sensors 36 (for example a magnetic field sensor, as has already been explained above) and incorporated into the control process, for example.

By way of example, further instances of the sensors 36 are used to sense whether respective instances of the doors 6, 7 are open or closed. As explained above, these may be door opening sensors, for example, that are each mounted on the ejection ram 19, for example.

By way of example, one of the sensors 36 may also be a sensor for electromagnetic signals (e.g. radio signals), for example an antenna having a power detector.

Furthermore, processor 31 can control one or more input/output units 37 that are optionally present. By way of example, an input/output unit 37 is a keypad, a display unit, a microphone, a touch-sensitive display unit, a loudspeaker, a reader, a disk drive, a lamp, a light-emitting diode, an optical capture means (e.g. a scanner) and/or a camera. By way of example, an input/output unit 37 can take inputs from a user and forward them to processor 31 and/or can receive and output information for the user from processor 31.

By way of example, the components 31 to 38 may together be in the form of a module, or at least some of them may be in the form of individual modules in order to ensure easy interchangeability in the event of any defects. Access control apparatus 30 can comprise not only the components 31 to 38 but also further components and is not limited to these components. For example, access control apparatus can comprise one or more power supply means such as a battery as a further component.

The access control apparatus 30 can be operated at least in two different modes of operation, namely at least in an active mode and in an energy saving mode.

In the active mode, at least all the main functions of the components of the access control apparatus 30 are active, for example. A main function of the first communication means 33 and of the second communication means 34 is the communication function, for example. For example, the first communication means 33 and the second communication means 34 can only communicate with other apparatuses in the active mode. In the energy saving mode, the components of the access control apparatus 30 (and hence the access control apparatus 30) consume less power than in the active mode. For example, at least some of the components such as the second communication means 34 are deactivated in the energy saving mode, whereas other components such as the first communication means 33 are in an energy saving detection mode, for example.

By way of example, a detection mode is an energy saving mode in which a means and/or a component checks whether a predefined condition is satisfied at regular and/or irregular intervals of time. If the predefined condition is satisfied, then the means and/or the component changes the operating mode (e.g. from the detection mode to the active mode), for example. For example, the detection of a presence of an access authorization verification apparatus in the surroundings of the access control apparatus 30 is one such condition. For example, the first communication interface 33 is configured to perform the detection of a presence of an access authorization verification apparatus in the surroundings of the access control apparatus 30 autonomously when the first communication interface 33 is in the detection mode and/or so long as the access control apparatus 30 is in the energy saving mode.

FIG. 11 is a flow chart 110 that presents the steps of a method according to the invention by way of example. The steps presented in the flow chart 110 are performed and/or controlled by components of the access control apparatus 30. By way of example, at least some of the steps are performed and/or controlled by the first communication interface 33 and/or the processor 31 of the access control apparatus 30.

In a step 111, a presence of an access authorization verification apparatus in the surroundings of the access control apparatus 30 is detected by the first communication interface 33. By way of example, detection of a presence of an access authorization verification apparatus in the surroundings of the access control apparatus by the first communication interface 33 is intended to be understood to mean that the first communication interface 33 establishes that there is at least a high probability of an access authorization verification apparatus being in the surroundings of the access control apparatus 30.

By way of example, the surroundings of the access control apparatus 30 in which a presence of an access authorization verification apparatus is detectable by the first communication interface 33 may be limited by the decrease in the power of a magnetic, electrical and/or electromagnetic field generated by the first communication interface. By way of example, such a field can be emitted by an antenna. For example, the surroundings of the access control apparatus 30 in which a presence of an access authorization verification apparatus is detectable by the first communication interface 33 is limited to a spatial region at a distance of less than 50 cm, preferably less than 30 cm, particularly preferably less than 12 cm, from the first communication interface 33 (e.g. from the NFC antenna of the first communication interface 33).

One possible refinement of the detection of a presence of an access authorization verification apparatus in the surroundings of the access control apparatus 30 by the first communication interface 33 is described below with reference to steps 121 to 123 of the flow chart 120 (see FIG. 12).

In addition, it is also conceivable for a presence of an access authorization verification apparatus in the surroundings of the access control apparatus 30 to be detected by the optional sensors 36. As described above, one of the sensors 36 may be a sensor for electromagnetic signals. For example, this sensor 36 can capture electromagnetic signals from the access authorization verification apparatus and, by way of example, evaluate the power of the captured signals. If the power of the captured signals (e.g. of at least one captured signal or of multiple captured signals) is above a power threshold value, for example, then it is determined that an access authorization verification apparatus is present in the surroundings of the access control apparatus 30, for example. The electromagnetic signals may have a frequency of 2.4 GHz (e.g. Bluetooth signals), for example.

In a step 112, if the presence of the access authorization verification apparatus has been detected in step 111, a change of operating mode of the second communication interface 34 of the access control apparatus 30 is caused.

By way of example, causing a change of operating mode of the second communication interface 34 of the access control apparatus 30 is intended to be understood to mean that a change of the operating mode of the second communication interface 34 from one operating mode to another operating mode is induced (e.g. by the first communication interface 33 and/or the processor 31).

One possible refinement of causing, when a presence of an access authorization verification apparatus in the surroundings of the access control apparatus 30 is detected, a change of operating mode of the second communication interface 34 of the access control apparatus 30 is described below with reference to steps 123 and 124 of the flow chart 120 (see FIG. 12).

FIG. 12 is a flow chart 120 that presents the steps of an example of a method according to the invention. The steps presented in the flow chart 120 are performed and/or controlled by components of the access control apparatus 30. By way of example, at least some of the steps are performed and/or controlled by the first communication interface 33 and/or the processor 31 of the access control apparatus 30. At the beginning of the flow chart, the access control apparatus 30 is in the energy saving mode. For example, the first communication interface 33 is in a detection mode when the access control apparatus is in the energy saving mode.

In a step 121, at least one physical quantity pertaining to the detection of a presence of an access authorization verification apparatus in the surroundings of the access control apparatus 30 by the first communication interface 33 is captured.

As described above, the resistance of an antenna can be altered when an object is brought into the surroundings of the access control apparatus. On account of the alteration in the resistance, the current strength of the current in the antenna when the burst signal is sent also alters, so that this means that it can be detected that an object is in the surroundings of the access control apparatus. The resistance of an NFC antenna (e.g. of a magnetic antenna) is altered when an object having ferromagnetic properties is brought into the surroundings of the NFC antenna, for example.

For example, in step 121, a physical quantity is captured that alters when a resistance of an NFC antenna of the first communication interface 33 alters. For example, the first communication interface 33 uses the NFC antenna to send a signal in step 121 and captures the current strength of a current in the NFC antenna when the signal is sent (e.g. the current strength of the driver current in the antenna when the signal is sent). If the power when the signal is sent is always the same in step 121, for example, then it is possible to infer from an alteration in the current strength an alteration in the resistance of the NFC antenna and hence a presence of an object having ferromagnetic properties in the surroundings of the access control apparatus.

In a step 122, a measured value representing the at least one physical quantity captured for the detecting is compared with at least one calibration value.

For example, the calibration value represents a measured value of the physical quantity in the state in which the access authorization verification apparatus is not present, or at least has a high probability of not being present, in the surroundings of the access control apparatus. The comparison of the measured value representing the at least one physical quantity captured for the detecting with the at least one calibration value can therefore determine whether the physical quantity has altered in comparison with the state in which the access authorization verification apparatus is not present in the surroundings of the access control apparatus. By way of example, provision is made for the measured value representing the at least one physical quantity captured for the detecting to be compared with an upper calibration value and a lower calibration value. For example, the calibration values are chosen such that if the measured value is not between the lower calibration value and the upper calibration value, then there is a high probability of a presence of an access authorization verification apparatus in the surroundings of the access control apparatus 30.

In the example above, a measured value that represents the current strength of the current in the antenna when the signal is sent in step 121, for example, is compared with an upper calibration value and a lower calibration value, which represent the current strength of the current in the antenna when the signal is sent, when the access authorization verification apparatus is not present, or at least has a high probability of not being present, in the surroundings of the access control apparatus.

In the flow chart 120, the calibration value is determined in step 127, for example, immediately before the access control apparatus 30 changes to the energy saving mode, since it is assumed that the access authorization verification apparatus at least has a high probability of not being present in the surroundings of the access control apparatus at this time.

In a step 123, it is determined whether an access authorization verification apparatus is present in the surroundings of the access control apparatus. By way of example, a presence of an access authorization verification apparatus is detected when the discrepancy between the measured value representing the at least one physical quantity captured for the detecting and the calibration value exceeds a predefined threshold value. For example, the first communication means 33 are configured to compare the measured value with a calibration value.

In the example above, it is determined, for example, that an access authorization verification apparatus is present in the surroundings of the access control apparatus 30 when the measured value that represents the current strength of the current in the NFC antenna when the signal is sent in step 121 is greater than the upper calibration value or less than the lower calibration value.

As described above, the first communication interface 33 is preferably configured to perform and/or control steps 121 to 123 autonomously so long as the access control apparatus 30 is in the energy saving mode.

If it is determined in step 123 that an access authorization verification apparatus is present in the surroundings of the access control apparatus 30, then the flow chart 120 is continued with step 124. Otherwise, step 121 is performed again. For example, steps 121 to 123 are repeated at regular intervals of time until it is determined in step 123 that an access authorization verification apparatus is present in the surroundings of the access control apparatus 30. For example, steps 121 to 123 are repeated every 375 ms.

In a step 124, a change of the operating mode of the access control apparatus from an energy saving mode to an active mode is caused.

For example, in step 124, the first communication interface 33 generates a piece of information about the presence of the access authorization verification apparatus in the surroundings of the access control apparatus 30. For example, the processor 31 is configured to control (e.g. by means of appropriate control signals) a change of the access control apparatus 30 from the energy saving mode to the active mode when the processor 31 obtains a piece of information about a presence of an access authorization verification apparatus in the surroundings of the access control apparatus.

For example, the first communication interface 33 is configured to change from the detection mode to the active mode when it is determined that an access authorization verification apparatus is present in the surroundings of the access control apparatus 30. For example, the first communication means 33 store a piece of information about the operating mode of the first communication means 33 in a register. For example, the processor 31 queries the register (and hence requests a piece of information about the presence of the access authorization verification apparatus in the surroundings of the access control apparatus) at regular intervals of time when the access control apparatus 30 is in the energy saving mode. For example, the processor 31 controls to control (e.g. by means of appropriate control signals) a change of the other components and hence of the access control apparatus 30 from the energy saving mode to the active mode when the result of a query to the register is that the first communication means 33 are in the active mode.

Alternatively, it is conceivable, by way of example, for the first communication interface 33 to send a piece of information about a presence of an access authorization verification apparatus in the surroundings of the access control apparatus 30 and/or a wakeup signal to the processor 31. For example, the processor 31 controls a change of the components and hence of the access control apparatus 30 from the energy saving mode to the active mode (e.g. by means of appropriate control signals) when it receives the information about a presence of an access authorization verification apparatus in the surroundings of the access control apparatus 30 and/or a wakeup signal.

By way of example, this is advantageous because only the first communication interface 33 is used for the detection and the processor 31 monitors whether a presence of an access authorization verification apparatus in the surroundings of the access control apparatus 30 has been detected. The other components of the access control apparatus 30 can therefore be completely deactivated in the energy saving mode.

When the access control apparatus 30 is in the active mode, the access control apparatus 30 can grant access to the first receiving compartment and/or the second receiving compartment of the parcel box 1, for example. For example, the communication interfaces 33, 34 in the active mode can communicate wirelessly with an access authorization verification apparatus and, for example, obtain a piece of access authorization information from an access authorization verification apparatus. For example, the processor 31 of the access control apparatus 30 in the active mode is configured to decide, at least in part on the basis of a piece of access authorization information obtained from an access authorization verification apparatus, whether access to the first receiving compartment or to the first and second receiving compartments of the parcel box 1 can be granted. For example, the processor 31 is configured to actuate the drive controller 35, when access to the first receiving compartment can be granted, such that the drive 14 rotates the rod 13 into the first adjustment position, so that the hook closure 11 of the first locking module 9 releases a bolt element of the door 6 and the door 6 can be opened. For example, the processor 31 is configured to actuate the drive controller 35, when access to the first and second receiving compartments can be granted, such that the drive 14 rotates the rod 13 into the second adjustment position, so that the hook closure 11 of the first locking module 9 releases a bolt element of the door 6 and the door 6 can be opened and that the hook closure 11 of the second locking module 10 releases a bolt element of the door 7 and the door 7 can be opened. By way of example, a door opening sensor can monitor whether the door is open and/or closed.

In an optional step 125, the active time since at least one event captured by the access control apparatus took place is measured. For example, the processor 31 measures the active time.

For example, the measurement of the active time is started when, in step 123, it is determined that an access authorization verification apparatus is present in the surroundings of the access control apparatus 30 and the access control apparatus changes to the active mode. For example, provision may be made for the measured active time to be reset each time an event is captured by the access control apparatus. In this case, each event that can infer an activity by a user and is capturable by the access control apparatus, for example, can result in the active time being reset.

As described above, an event captured by the access control apparatus 30 may be, by way of example, detecting a presence of the access authorization verification apparatus in the surroundings of the access control means, receiving access authorization information from an access authorization verification apparatus, causing the unlocking of at least one door and/or opening at least one door. The events can be captured by the sensors 36, the processor 31, the first communication interface 33 and/or the second communication interface 34, for example.

In an optional step 126, it is determined (e.g. by means of the processor 31) whether the measured active time is greater than a predefined active time threshold value. The predefined active time threshold value is less than 1 hour, preferably less than 30 minutes, particularly preferably less than 16 minutes, for example. If the predefined active time threshold value is exceeded, then it can be assumed, by way of example, that there is at least a high probability of no user (e.g. neither a delivery agent nor a user) currently wishing to use the parcel box 1. In this case, it may therefore be advantageous, in order to save energy, to cause the change of the access control apparatus from the active mode to the energy saving mode (step 128).

If it is determined in step 126 that the measured active time is greater than a predefined active time threshold value, then the flow chart 120 is continued with step 127. Otherwise, the measurement of the active time is continued in accordance with step 125.

In an optional step 127, the first communication interface 33 is calibrated for detecting a presence of an access authorization verification apparatus in the surroundings of the access control apparatus. For example, the calibrating is performed by the first communication interface 33.

For example, the physical quantity is captured in step 127. In the example above, for the calibrating in step 127, the first communication interface 33 captures a current strength of a current in the NFC antenna when the signal is sent (e.g. the current strength of the driver current in the antenna when the signal is sent, for example).

In addition, in step 127, the at least one calibration value is determined at least in part on the basis of the physical quantity captured for calibration. For example, determining the at least one calibration value can comprise determining an upper calibration value and a lower calibration value (e.g. by means of additions or subtraction of a safety value from a measured value representing the physical quantity captured in step 127).

As described above, it is assumed that the probability of an access authorization verification apparatus being in the surroundings of the access control apparatus 30 is low when the access control apparatus 30 changes from the active mode to the energy saving mode. The performance of step 127 before step 128 is therefore an advantageous time. Alternatively, it is conceivable for step 127 to be performed after step 128 or during step 128.

In an optional step 128, a change of the operating mode of the access control apparatus 30 from the active mode to the energy saving mode is caused. This is advantageous, by way of example, in order to reduce the power consumption of the access control apparatus. For example, the processor controls the change of the access control apparatus 30 and the components thereof to the energy saving mode. By way of example, the first communication interface 33 changes to the detection mode when the access control apparatus changes to the energy saving mode.

Following the change of the operating mode of the access control apparatus 30, the flow chart 120 starts again with step 121.

Figure 13:
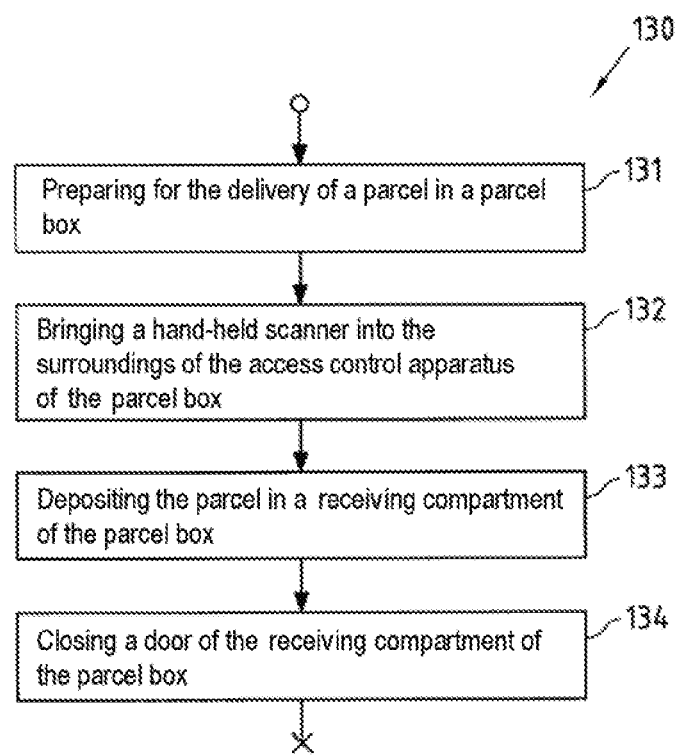
FIG. 13 shows a flow chart for an example of a use according to the invention.

FIG. 13 is a flow chart 130 that presents the steps of an example of a use according to the invention. The steps presented in the flow chart 130 are performed by a delivery agent of the parcel box 1 and are described below from the perspective of said delivery agent. In the example presented in FIG. 13, the delivery agent wishes to open the door 6 of the parcel box 1 in order to be able to deposit a parcel in the first receiving compartment and hence deliver said parcel. In this example, it is assumed that the delivery agent uses a hand-held scanner (e.g. Honeywell's LXE Tecton MX7) as access authorization verification apparatus.

In a step 131, the delivery agent prepares for the delivery of the parcel in the parcel box 1.

For example, the delivery agent scans a barcode that has been put on the parcel using the hand-held scanner in step 131. This allows the hand-held scanner to identify the parcel, for example, and to retrieve the shipment information associated with the parcel. By way of example, the shipment information contains information about possible delivery of the parcel into a parcel box of the recipient. For example, one or more parcel boxes into which the parcel can be delivered are displayed to the delivery agent on the hand-held scanner.

For example, in step 131, the delivery agent confirms the parcel box 1 in to which he wishes to deposit the parcel, or selects the parcel box 1 into which he wishes to deposit the parcel, from the displayed parcel boxes. By way of example, this makes it possible to ensure that the delivery agent also deposits the parcel in a parcel box associated with the parcel or with the recipient of the parcel, and the search comprising many data records is simplified. In addition, the hand-held scanner can retrieve or generate a piece of access authorization information, which authorizes access to the first receiving compartment of the parcel box 1, on the basis of the confirmed or selected parcel box 1.

In a step 132, the delivery agent brings the hand-held scanner into the surroundings of the access control apparatus 30 of the parcel box 1.

For example, the delivery agent holds the hand-held scanner in the surroundings of the access control apparatus 30 such that the presence of the hand-held scanner in the surroundings of the access control apparatus 30 is detectable by the first communication interface 33.

As described above in relation to steps 121 to 124 (see FIG. 12), for example, the access control apparatus 30 changes, by way of example, from the energy saving mode to the active mode when the first communication interface 33 detects the presence of the hand-held scanner in the surroundings of the access control apparatus 30. The hand-held scanner then communicates the access authorization information to the second communication device 34, for example. For example, the door 6 of the parcel box 1 is unlocked and opened, as described above, when the access authorization information authorizes access to the first receiving compartment of the parcel box. By way of example, the delivery agent is provided with appropriate feedback by the hand-held scanner (e.g. a message indicating that access is granted is displayed).

Only as a result of the delivery agent bringing the hand-held scanner into the surroundings of the access control apparatus 30 of the parcel box 1 is he thus able to induce the access control apparatus to wake up (that is to say also the operating mode of the second communication interface to change) and the door 6 of the parcel mailbox 1 to be unlocked and opened.

In a step 133, the delivery agent deposits the parcel in the first receiving compartment of the parcel box 1.

In a step 134, the delivery agent closes the door 6 of the first receiving compartment of the parcel box 1. As described above, the door 6 is thereby locked automatically on the basis of a catch function, for example.

The exemplary embodiments of the present invention that are described in this specification are intended to be understood as also disclosed in all combinations with one another. In particular, the description of a feature that an embodiment comprises is—unless explicitly explained to the contrary— also not intended to be understood, in the present case, to mean that the feature is indispensible or essential for the function of the exemplary embodiment. The sequence of the method steps outlined in this specification in the individual flow charts is not imperative, and alternative sequences of the method steps are conceivable. The method steps can be implemented in different ways, an implementation in software (by virtue of program instructions), hardware or a combination of the two is thus conceivable for implementing the method steps. Terms used in the patent claims such as "comprise", "have", "contain", "include" and the like do not exclude further elements or steps. The wording "at least in part" covers both the "in part" case and the "completely" case. The wording "and/or" is intended to be understood to mean that both the alternative and a combination are intended to be disclosed, that is to say that "A" and/or "B" means "(A) or (B) or (A and B)". Within the context of this specification, a plurality of units, persons or the like means multiple units, persons or the like. The use of the indefinite article does not exclude a plurality. A single device can carry out the functions of multiple units or devices cited in the patent claims. Reference symbols specified in the patent claims are not intended to be regarded as limitations for the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   detecting a presence of an access authorization verification apparatus in surroundings of an access control apparatus by first communication means of the access control apparatus, and
   causing when the presence of the access authorization verification apparatus in the surroundings of the access control apparatus is detected, a change of an operating mode of second communication means of the access control apparatus,
   wherein the first communication means are configured to communicate wirelessly in accordance with a first communication technique, wherein the second communication means are configured to communicate wirelessly in accordance with a second communication technique, which is different than the first communication technique, wherein the detecting by the first communication means of the access control apparatus is effected without communication between the first communication means of the access control apparatus and the access authorization verification apparatus, wherein the presence of the access authorization verification apparatus in the surroundings of the access control apparatus alters at least one physical quantity that is capturable by the first communication means of the access control apparatus, and wherein the physical quantity is altered solely by virtue of the access authorization verification apparatus being brought into the surroundings of the access control apparatus.

2. The method according to claim 1, wherein the first communication technique and the second communication technique are communication techniques according to one of the following communication standards: radio frequency identification-specification, near field communication-specification or Bluetooth®-specification.

3. The method according to claim 1, the method further comprising:
   calibrating the first communication means for detecting a presence of an access authorization verification apparatus in the surroundings of the access control apparatus, wherein the presence of the access authorization verification apparatus in the surroundings of the access control apparatus renders at least one physical quantity that is capturable by the first communication means alterable, and wherein the first communication means capture the physical quantity for calibrating the first communication means in a state, in which the access authorization verification apparatus is not present in the surroundings of the access control apparatus.

4. The method according to claim 3, wherein the at least one physical quantity is a current strength of a current in an antenna of the first communication means when a signal is sent.

5. The method according to claim 3, the method comprising:
   capturing the at least one physical quantity for detecting a presence of an access authorization verification apparatus in the surroundings of the access control apparatus, and
   comparing a measured value that represents the at least one physical quantity captured for the detecting with at least one calibration value.

6. The method according to claim 3, the calibrating comprising:
   capturing the at least one physical quantity by the first communication means for calibrating the first communication means for the detecting, and
   determining the at least one calibration value at least in part on the basis of the physical quantity captured for the calibrating.

7. The method according to claim 1, the method further comprising:
   generating, when the presence of the access authorization verification apparatus in the surroundings of the access control apparatus is detected, a piece of information about the presence of the access authorization verification apparatus in the surroundings of the access control apparatus.

8. The method according to claim 7, the method further comprising:
   storing the piece of information in a memory of the first communication means, and/or
   transmitting the piece of information to control means of the access control apparatus and/or to the second communication means.

9. The method according to claim 1, the method further comprising:
   obtaining access authorization information from the access authorization verification apparatus by the first communication means and/or the second communication means,
   deciding whether access can be granted, at least in part on the basis of the obtained access authorization information, and
   causing unlocking of one or more doors of a receiving apparatus if it has been decided that access can be granted.

10. The method according to claim 1, the method further comprising:
    causing a change of the operating mode of the first communication means, of the second communication means and/or of the access control apparatus from an energy saving mode to an active mode when the presence of the access authorization verification apparatus in the surroundings of the access control apparatus is detected.

11. The method according to claim 10, the method further comprising:
    measuring the active time since at least one event captured by the access control apparatus has taken place, and
    causing, when the measured active time exceeds a predefined active time threshold value, changing the operating mode of the first communication means, of the second communication means and/or of the access control apparatus from the active mode to the energy saving mode.

12. The method according to claim 1, wherein the first communication means are in a detection mode for the detecting, and wherein the second communication means are in an energy saving mode for the detecting.

13. A non-transitory machine-readable medium having stored thereon a computer program, comprising program instructions that cause a processor to perform and/or control the method according to claim 1 when the computer program runs on the processor.

14. An access control apparatus comprising at least one processor and at least one memory that contains program code, wherein the memory and the program code are configured to with the processor, cause the apparatus to perform:
    detecting a presence of an access authorization verification apparatus in surroundings of an access control apparatus by first communication means of the access control apparatus, and
    causing when the presence of the access authorization verification apparatus in the surroundings of the access control apparatus is detected, a change of an operating mode of second communication means of the access control apparatus,
    wherein the first communication means are configured to communicate wirelessly in accordance with a first communication technique, wherein the second communication means are configured to communicate wirelessly in accordance with a second communication technique, which is different than the first communication technique, wherein the detecting by the first communication means of the access control apparatus is effected without communication between the first communication means of the access control apparatus and the access authorization verification apparatus, wherein the presence of the access authorization verification apparatus in the surroundings of the access control apparatus alters at least one physical quantity that is capturable by the first communication means of the access control apparatus, and wherein the physical quantity is altered solely by virtue of the access authorization verification apparatus being brought into the surroundings of the access control apparatus.

15. A receiving apparatus comprising:
    a housing,
    at least one door for closing at least one housing opening,
    a locking means that is configured to lock and unlock the at least one door, and
    an access control apparatus as claimed in claim 14.

16. A system comprising:
    a receiving apparatus as claimed in claim 15, and
    an access authorization verification apparatus.

17. The use of an access authorization verification apparatus in the surroundings of the access control apparatus according to claim 14 such that a presence of the access authorization verification apparatus in the surroundings of the access control apparatus is detectable by first communication means of the access control apparatus in order to induce a change of an operating mode of second communication means of the access control apparatus to be caused.

18. The access control apparatus according to claim 14, wherein the first communication means comprise a first communication interface and the second communication means comprise a second communication interface, and wherein the first communication technique and the second communication technique are communication techniques according to one of the following communication standards: radio frequency identification-specification, near field communication-specification or Bluetooth®-specification.

19. The access control apparatus according to claim 14, wherein the memory and the program code are further configured to, with the processor, cause the apparatus to perform:
    calibrating the first communication means for detecting a presence of an access authorization verification apparatus in the surroundings of the access control apparatus, wherein the presence of the access authorization verification apparatus in the surroundings of the access control apparatus renders at least one physical quantity that is capturable by the first communication means alterable, and wherein the first communication means capture the physical quantity for calibrating the first communication means in a state, in which the access authorization verification apparatus is not present in the surroundings of the access control apparatus.

20. The access control apparatus according to claim 19, wherein the at least one physical quantity is a current strength of a current in an antenna of the first communication means when a signal is sent.

21. The access control apparatus according to claim 19, wherein the memory and the program code are further configured to, with the processor, cause the apparatus to perform:
    capturing the at least one physical quantity for detecting a presence of an access authorization verification apparatus in the surroundings of the access control apparatus, and
    comparing a measured value that represents the at least one physical quantity captured for the detecting with at least one calibration value.

22. The access control apparatus according to claim 19, the calibrating comprising:
    capturing the at least one physical quantity by the first communication means for calibrating the first communication means for the detecting, and
    determining the at least one calibration value at least in part on the basis of the physical quantity captured for the calibrating.

* * * * *